US011374681B2

(12) United States Patent
Xiong et al.

(10) Patent No.: US 11,374,681 B2
(45) Date of Patent: Jun. 28, 2022

(54) VIDEO QUALITY ASSESSMENT METHOD AND DEVICE

(71) Applicant: HUAWEI TECHNOLOGIES CO., LTD., Guangdong (CN)

(72) Inventors: Jie Xiong, Nanjing (CN); Yanfang Zhang, Nanjing (CN); Ligang Feng, Beijing (CN); Jian Cheng, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/664,194

(22) Filed: Oct. 25, 2019

(65) Prior Publication Data

US 2020/0067629 A1 Feb. 27, 2020

Related U.S. Application Data

(63) Continuation of application No. PCT/CN2017/120446, filed on Dec. 31, 2017.

(30) Foreign Application Priority Data

Apr. 27, 2017 (CN) .......................... 201710288618.6

(51) Int. Cl.
*H04L 1/00* (2006.01)
*H04N 19/154* (2014.01)
(Continued)

(52) U.S. Cl.
CPC .......... *H04L 1/0009* (2013.01); *H04L 1/0041* (2013.01); *H04L 1/0057* (2013.01);
(Continued)

(58) Field of Classification Search
CPC ................. H04L 1/0009; H04L 1/0041; H04L 1/0057; H04L 29/06; H04L 65/80; H04N 19/154;
(Continued)

(56) References Cited

U.S. PATENT DOCUMENTS 5,600,663 A 2/1997 Ayanoglu et al.
9,030,565 B2 5/2015 Yang et al.
(Continued)

FOREIGN PATENT DOCUMENTS

CN 101442400 A 5/2009
CN 101686106 A 3/2010
(Continued)

OTHER PUBLICATIONS

A. Begen et al. Guidelines for Implementing Digital Video Broadcasting—IPTV (DVB-IPTV), Application-Layer Hybrid Forward Error Correction (FEC) Protection, RFC6683, Aug. 2012. total 12 pages. XP055650524.
(Continued)

*Primary Examiner* — Lakeram Jangbahadur
(74) *Attorney, Agent, or Firm* — Womble Bond Dickinson (US) LLP

(57) ABSTRACT

A video quality assessment method and device are provided. The video quality assessment method includes: obtaining a to-be-assessed video, where the to-be-assessed video includes a forward error correction (FEC) redundancy data packet; when a quantity of lost data packets of a first source block in the to-be-assessed video is less than or equal to a quantity of FEC redundancy data packets of the first source block, generating a first summary packet for a non-lost data packet of the first source block, and generating a second summary packet for a lost data packet of the first source block; and calculating a mean opinion score of video (MOSV) of the to-be-assessed video based on the first summary packet and the second summary packet. The MOSV calculated according to the method is more consistent with real video experience of a user, so accuracy of video quality assessment can be improved.

15 Claims, 11 Drawing Sheets

(51) Int. Cl.
*H04N 19/89* (2014.01)
*H04N 17/00* (2006.01)

(52) U.S. Cl.
CPC ......... *H04N 17/004* (2013.01); *H04N 19/154* (2014.11); *H04N 19/89* (2014.11); *H04N 2017/006* (2013.01); *H04N 2017/008* (2013.01)

(58) Field of Classification Search
CPC ................. H04N 19/89; H04N 17/004; H04N 2017/006; H04N 2017/008; H04N 21/6375; H04N 21/6473; H04N 21/64738; H04N 21/64776; H04N 19/188; H04N 21/44209; H04N 17/00; H04N 21/24; H04N 21/442; H04N 21/6437; H04N 21/647; H04N 21/2402; H04N 21/64792
See application file for complete search history.

(56) References Cited

U.S. PATENT DOCUMENTS

| | | | |
|---|---|---|---|
| 2003/0121053 A1 | 6/2003 | Honda | |
| 2009/0138776 A1* | 5/2009 | Bauchot | H04L 1/1887 714/748 |
| 2009/0138932 A1 | 5/2009 | Bauchot et al. | |
| 2011/0001833 A1 | 1/2011 | Grinkemeyer et al. | |
| 2011/0289540 A1* | 11/2011 | Yachida | H04N 21/6125 725/109 |
| 2012/0212624 A1* | 8/2012 | Yang | H04N 19/172 348/180 |
| 2013/0170391 A1* | 7/2013 | Feiten | H04N 17/004 370/252 |
| 2013/0286868 A1* | 10/2013 | Oyman | H04W 24/06 370/252 |
| 2014/0185474 A1* | 7/2014 | Martins | H04L 1/20 370/252 |
| 2015/0085942 A1* | 3/2015 | Xie | H04N 19/179 375/240.27 |
| 2015/0110204 A1* | 4/2015 | Sun | H04N 19/146 375/240.26 |

FOREIGN PATENT DOCUMENTS

| | | |
|---|---|---|
| CN | 102056004 A | 5/2011 |
| CN | 103166808 A | 6/2013 |
| CN | 104349220 A | 2/2015 |

OTHER PUBLICATIONS

Gardikis Get Al: Cross-layer monitoring in IPTV networks, IEEE Communications Magazine • Jul. 2012, pp. 76-84. XP011478263.
Georg Carle et al. Survey of Error Recovery Techniques for IP-Based AudioVis ual Multicast Applications, IEEE Network * Nov. Dec. 1997, pp. 24-36 XP000737463.
ITU-T p. 910 (Apr. 2008), SERIES P. Telephone Transmission Quality, Telephone Installations, Local Line Networks Audiovisual quality in multimedia services, Subjective video quality assessment methods for multimedia applications, Apr. 2008. total 42 pages.
ITU-T p. 1201.2(Apr. 2014), Series P: Terminals and Subjective and Objective Assessment Methods, Models and tools for quality assessment of streamed media, Parametric non-intrusive assessment of audiovisual media streaming quality—Higher resolution application area, Corrigendum 1, Apr. 2014. total 8 pages.
A. Raake et al.,"T-V-Model: Parameter-Based Prediction of IPTV QUALITY",Published in: 2008 IEEE International Conference on Acoustics, Speech and Signal Processing,total 4 pages.

* cited by examiner

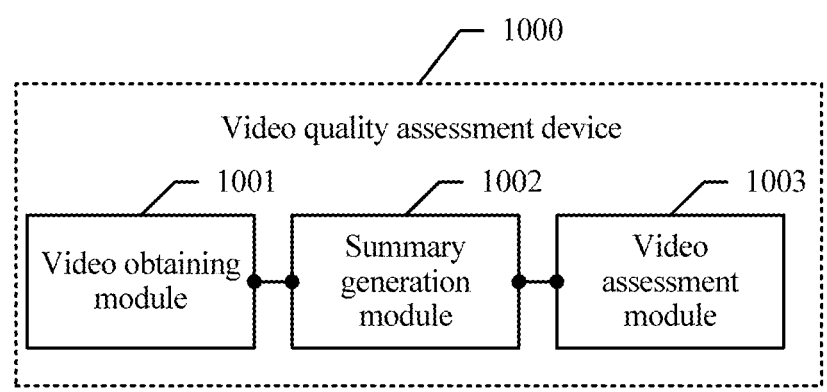
FIG. 10-a
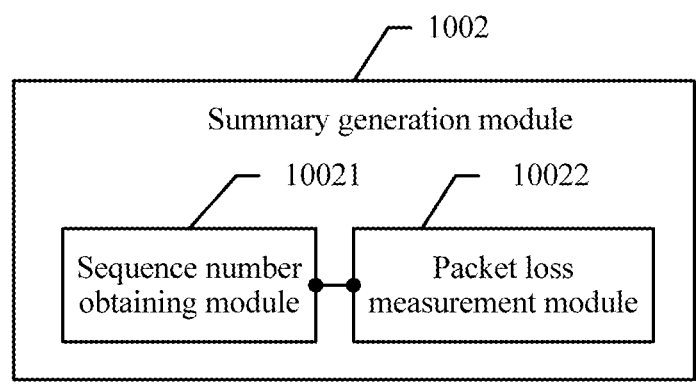
FIG. 10-b

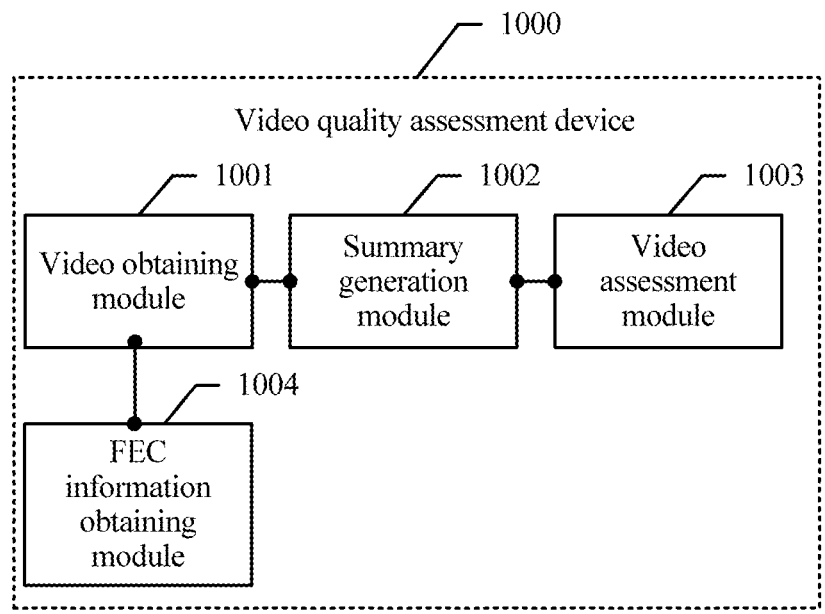
FIG. 10-c
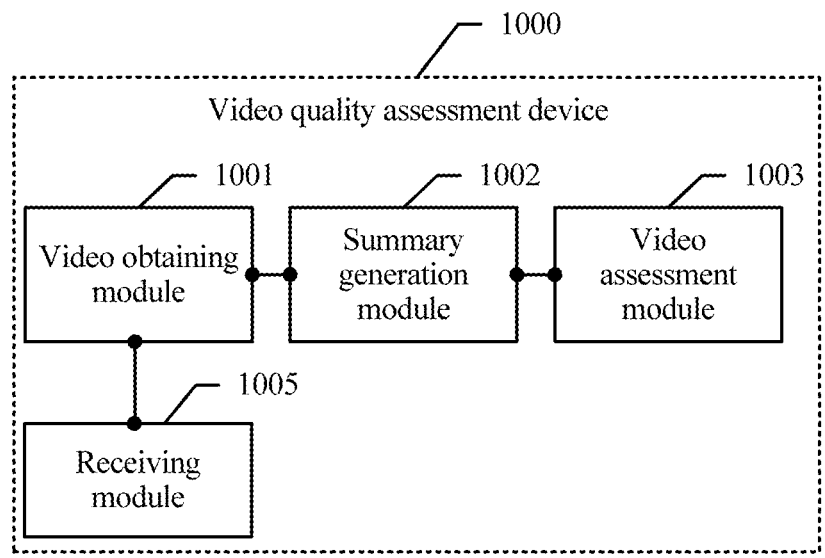
FIG. 10-d

VIDEO QUALITY ASSESSMENT METHOD AND DEVICE

CROSS-REFERENCE TO RELATED APPLICATIONS

This application is a continuation of International Application No. PCT/CN2017/120446, filed on Dec. 31, 2017, which claims priority to Chinese Patent Application No. 201710288618.6, filed on Apr. 27, 2017. The disclosures of the aforementioned applications are hereby incorporated by reference in their entireties.

TECHNICAL FIELD

This application relates to the field of computer technologies, and in particular, to a video quality assessment method and device.

BACKGROUND

An Internet Protocol television (IPTV) system is a system transmitting television information by using a broadband network as a medium. A user pays a telecommunications operator, and the telecommunications operator provides the user with an IPTV video headend, a content delivery network (CDN), a set-top box (STB), another network device for ensuring normal operation of an IPTV video service, and the like, and is responsible for consumed content of the user and quality of the IPTV video service.

In the prior art, in an IPTV monitoring solution, a video quality assessment device (namely, a probe) is deployed in a network to capture a live video stream, parse video-related parameters, measure a video packet loss status, and further assess a mean opinion score of video (MOSV). The MOSV is an assessment standard for measuring network video quality. In this standard, a video source compression impairment and a network transmission impairment of a received video are detected, and impact of the impairments on user experience of video watching is comprehensively modeled and scored. A scoring criterion is from the International Telecommunication Union-Telecommunication Standardization Sector (ITU-T) P.910. Generally, four scores or more mean good, three scores to four scores mean general, and three scores or less mean bad.

The IPTV video service is carried by using the Real-Time Transport Protocol (RTP) and the User Datagram Protocol (UDP). Because the UDP is an unreliable transmission protocol, media transmission is unreliable, and a packet loss easily occurs, leading to mosaic or artifact, resulting in relatively poor user experience, and seriously affecting IPTV service development. Therefore, operators usually deploy forward error correction (FEC) to implement service assurance, thereby reducing adverse impact of a case, such as a packet loss or a bit error of video data during transmission, on decoding.

In the prior art, to improve IPTV network service quality, a network operator usually uses various error recovery mechanisms to enhance an error tolerance capability of an IPTV video system for a network packet loss. However, in the prior art, after video data is captured, the captured video data is used for video quality assessment, resulting in an inaccurately calculated MOSV, and the MOSV cannot reflect real video experience of the user.

SUMMARY

Embodiments of this application provide a video quality assessment method and device, to improve accuracy of video quality assessment, and a calculated MOSV is more consistent with real video experience of a user.

To resolve the foregoing problem, the embodiments of this application provide the following technical solutions:

According to a first aspect, an embodiment of this application provides a video quality assessment method, including: obtaining a to-be-assessed video, where the to-be-assessed video includes a forward error correction (FEC) redundancy data packet; when a quantity of lost data packets of a first source block in the to-be-assessed video is less than or equal to a quantity of FEC redundancy data packets of the first source block, generating a first summary packet for a non-lost data packet of the first source block, and generating a second summary packet for a lost data packet of the first source block; and calculating a mean opinion score of video (MOSV) of the to-be-assessed video based on the first summary packet and the second summary packet.

In this embodiment of this application, because a data packet loss status of the first source block in the to-be-assessed video and a packet loss recovery status of the FEC redundancy data packet are considered, the first summary packet and the second summary packet are calculated, and the MOSV of the to-be-assessed video can be calculated based on the first summary packet and the second summary packet. Compared with the prior art in which an MOSV of only captured video data is assessed, in this embodiment of this application, a recovery capability of the FEC redundancy data packet for a lost data packet is considered. Therefore, video quality assessment is more accurate and is made more consistent with real video experience of a user.

With reference to the first aspect, in a first implementation of the first aspect, the quantity of lost data packets of the first source block is calculated in the following manner: obtaining a start Real-Time Transport Protocol (RTP) sequence number and an end RTP sequence number from the FEC redundancy data packet, and obtaining an RTP sequence number of the non-lost data packet of the first source block; and calculating the quantity of lost data packets of the first source block based on the start RTP sequence number, the end RTP sequence number, and the RTP sequence number of the non-lost data packet of the first source block. A total quantity of RTP data packets in the first source block can be determined based on the start RTP sequence number and the end RTP sequence number, and the RTP sequence number of the non-lost data packet is excluded, so that the quantity of lost data packets of the first source block can be calculated.

With reference to the first aspect or the first implementation of the first aspect, in a second implementation of the first aspect, the method further includes: obtaining an FEC source block size and FEC redundancy of the first source block. In this embodiment of this application, a video quality assessment device can obtain the FEC source block size and the FEC redundancy, so that the quantity of FEC redundancy data packets of the first source block can be determined by using the FEC source block size and the FEC redundancy.

With reference to the second implementation of the first aspect, in a third implementation of the first aspect, the obtaining an FEC source block size and FEC redundancy of the first source block includes: obtaining the FEC source block size and the FEC redundancy from the multimedia relay function (MRF) or a receiving device of the to-be-assessed video; or parsing a control packet of interaction between the receiving device of the to-be-assessed video and a video server, to obtain the FEC source block size and the FEC redundancy; or parsing an FEC redundancy data packet of the first source block, to obtain the FEC source block size and the FEC redundancy. The video quality assessment device can obtain the FEC source block size and the FEC redundancy in the foregoing three manners, and then determine the quantity of FEC redundancy data packets of the first source block.

With reference to the first aspect or the first or the second or the third implementation of the first aspect, in a fourth implementation of the first aspect, the method further includes: when the quantity of lost data packets of the first source block is 0, or the quantity of lost data packets of the first source block is greater than the quantity of FEC redundancy data packets of the first source block, generating the first summary packet for the non-lost data packet of the first source block; and calculating the MOSV of the to-be-assessed video based on the first summary packet. When the quantity of lost data packets of the first source block is 0, it indicates that no data packet loss occurs in the first source block. When the quantity of lost data packets of the first source block is greater than the quantity of FEC redundancy data packets of the first source block, it indicates that the first source block cannot recover the lost data packet in the first source block by using the FEC redundancy data packet. In the two cases, the first summary packet is generated for the non-lost data packet of the first source block, and finally, the MOSV of the to-be-assessed video is calculated based on the first summary packet. Therefore, the MOSV calculated by using only the first summary packet can indicate real video experience of a user.

With reference to the first aspect or the first or the second or the third or the fourth implementation of the first aspect, in a fifth implementation of the first aspect, the method further includes: receiving a retransmission request sent by the receiving device of the to-be-assessed video to a retransmission (RET) server, where the retransmission request is used to request the RET server to retransmit a data packet that is lost and cannot be recovered through FEC; and when a retransmission response returned by the RET server is received, generating a third summary packet for the data packet that is lost and cannot be recovered through FEC; and the calculating a mean opinion score of video (MOSV) of the to-be-assessed video based on the first summary packet and the second summary packet includes: calculating the MOSV of the to-be-assessed video based on the first summary packet, the second summary packet, and the third summary packet. In this embodiment of this application, the video quality assessment device considers recovery statuses of an FEC technology and an RET technology for the lost data packet of the to-be-assessed video, so that the MOSV of the to-be-assessed video can be calculated based on the first summary packet, the second summary packet, and the third summary packet. Because the recovery statuses of the FEC technology and the RET technology for the lost data packet are considered, video quality assessment is more accurate and is made more consistent with real experience of a user.

With reference to the first aspect or the first or the second or the third or the fourth or the fifth implementation of the first aspect, in a sixth implementation of the first aspect, the second summary packet includes: an RTP sequence number and a payload size of the lost data packet of the first source block, and summary information of a video transport stream video TS packet of the lost data packet of the first source block.

According to a second aspect, an embodiment of this application further provides a video quality assessment device, including: a video obtaining module, configured to obtain a to-be-assessed video, where the to-be-assessed video includes a forward error correction (FEC) redundancy data packet; a summary generation module, configured to: when a quantity of lost data packets of a first source block in the to-be-assessed video is less than or equal to a quantity of FEC redundancy data packets of the first source block, generate a first summary packet for a non-lost data packet of the first source block, and generate a second summary packet for a lost data packet of the first source block; and a video assessment module, configured to calculate a mean opinion score of video (MOSV) of the to-be-assessed video based on the first summary packet and the second summary packet.

In this embodiment of this application, because a data packet loss status of the first source block in the to-be-assessed video and a packet loss recovery status of the FEC redundancy data packet are considered, the first summary packet and the second summary packet are calculated, and the MOSV of the to-be-assessed video can be calculated based on the first summary packet and the second summary packet. Compared with the prior art in which an MOSV of only captured video data is assessed, in this embodiment of this application, a recovery capability of the FEC redundancy data packet for a lost data packet is considered. Therefore, video quality assessment is more accurate and is made more consistent with real video experience of a user.

With reference to the second aspect, in a first implementation of the second aspect, the summary generation module includes: a sequence number obtaining module, configured to: obtain a start Real-Time Transport Protocol (RTP) sequence number and an end RTP sequence number from the FEC redundancy data packet, and obtain an RTP sequence number of the non-lost data packet of the first source block; and a packet loss measurement module, configured to calculate the quantity of lost data packets of the first source block based on the start RTP sequence number, the end RTP sequence number, and the RTP sequence number of the non-lost data packet of the first source block. A total quantity of RTP data packets in the first source block can be determined based on the start RTP sequence number and the end RTP sequence number, and the RTP sequence number of the non-lost data packet is excluded, so that the quantity of lost data packets of the first source block can be calculated.

With reference to the second aspect or the first implementation of the second aspect, in a second implementation of the second aspect, the video quality assessment device further includes: an FEC information obtaining module, configured to obtain an FEC source block size and FEC redundancy of the first source block. In this embodiment of this application, the video quality assessment device can obtain the FEC source block size and the FEC redundancy, so that the quantity of FEC redundancy data packets of the first source block can be determined by using the FEC source block size and the FEC redundancy.

With reference to the second implementation of the second aspect, in a third implementation of the second aspect, the FEC information obtaining module is configured to: obtain the FEC source block size and the FEC redundancy from the MRF or a receiving device of the to-be-assessed video; or parse a control packet of interaction between the receiving device of the to-be-assessed video and a video server, to obtain the FEC source block size and the FEC redundancy; or parse an FEC redundancy data packet of the first source block, to obtain the FEC source block size and the FEC redundancy. The video quality assessment device can obtain the FEC source block size and the FEC redundancy in the foregoing three manners, and then determine the quantity of FEC redundancy data packets of the first source block.

With reference to the second aspect or the first or the second or the third implementation of the second aspect, in a fourth implementation of the second aspect, the summary generation module is further configured to: when the quantity of lost data packets of the first source block is 0, or the quantity of lost data packets of the first source block is greater than the quantity of FEC redundancy data packets of the first source block, generate the first summary packet for the non-lost data packet of the first source block; and the video assessment module is further configured to calculate the MOSV of the to-be-assessed video based on the first summary packet. When the quantity of lost data packets of the first source block is 0, it indicates that no data packet loss occurs in the first source block. When the quantity of lost data packets of the first source block is greater than the quantity of FEC redundancy data packets of the first source block, it indicates that the first source block cannot recover the lost data packet in the first source block by using the FEC redundancy data packet. In the two cases, the first summary packet is generated for the non-lost data packet of the first source block, and finally, the MOSV of the to-be-assessed video is calculated based on the first summary packet. Therefore, the MOSV calculated by using only the first summary packet can indicate real video experience of a user.

With reference to the second aspect or the first or the second or the third or the fourth implementation of the second aspect, in a fifth implementation of the second aspect, the video quality assessment device further includes a receiving module, where the receiving module is configured to receive a retransmission request sent by the receiving device of the to-be-assessed video to a retransmission (RET) server, where the retransmission request is used to request the RET server to retransmit a data packet that is lost and cannot be recovered through FEC; the summary generation module is further configured to: when a retransmission response returned by the RET server is received, generate a third summary packet for the data packet that is lost and cannot be recovered through FEC; and the video assessment module is configured to calculate the MOSV of the to-be-assessed video based on the first summary packet, the second summary packet, and the third summary packet. In this embodiment of this application, the video quality assessment device considers recovery statuses of an FEC technology and an RET technology for the lost data packet of the to-be-assessed video, so that the MOSV of the to-be-assessed video can be calculated based on the first summary packet, the second summary packet, and the third summary packet. Because the recovery statuses of the FEC technology and the RET technology for the lost data packet are considered, video quality assessment is more accurate and is made more consistent with real experience of a user.

With reference to the second aspect or the first or the second or the third or the fourth or the fifth implementation of the second aspect, in a sixth implementation of the second aspect, the second summary packet includes: an RTP sequence number and a payload size of the lost data packet of the first source block, and summary information of a video transport stream video TS packet of the lost data packet of the first source block.

According to a third aspect, an embodiment of this application further provides another video quality assessment device, where the video quality assessment device includes a processor, a memory, a receiver, a transmitter, and a bus, where the processor, the receiver, the transmitter, and the memory communicate with each other by using the bus; the receiver is configured to receive data; the transmitter is configured to send data; the memory is configured to store an instruction; and the processor is configured to execute the instruction in the memory, to perform the method according to the first aspect or any implementation of the first aspect.

According to a fourth aspect of this application, a composition module of a video quality assessment device may further perform an operation described in the first aspect and the implementations. For details, refer to the descriptions of the first aspect and the implementations.

A fifth aspect of this application provides a computer readable storage medium, where the computer readable storage medium stores an instruction, and when the computer readable storage medium runs on a computer, the computer performs the method according to the foregoing aspects.

A sixth aspect of this application provides a computer program product including an instruction, where when the computer program product runs on a computer, the computer performs the method according to the foregoing aspects.

BRIEF DESCRIPTION OF DRAWINGS

FIG. 10-$a$ is a schematic structural composition diagram of a video quality assessment device according to an embodiment of this application;

FIG. 10-$b$ is a schematic structural composition diagram of a summary generation module according to an embodiment of this application;

FIG. 10-$c$ is a schematic structural composition diagram of another video quality assessment device according to an embodiment of this application;

FIG. 10-$d$ is a schematic structural composition diagram of another video quality assessment device according to an embodiment of this application.

DESCRIPTION OF EMBODIMENTS

The embodiments of this application provide a video quality assessment method and device, to improve accuracy of video quality assessment, and are more consistent with real video experience of a user.

The following describes the embodiments of this application with reference to accompanying drawings.

In the specification, claims, and accompanying drawings of this application, terms "first", "second", and so on are intended to distinguish between similar objects but do not necessarily indicate a specific order or sequence. One of skill in the art understands that the terms used in such a manner are interchangeable in a proper case. This is merely a discrimination manner that is used when objects having a same attribute are described in the embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

Figure 1:
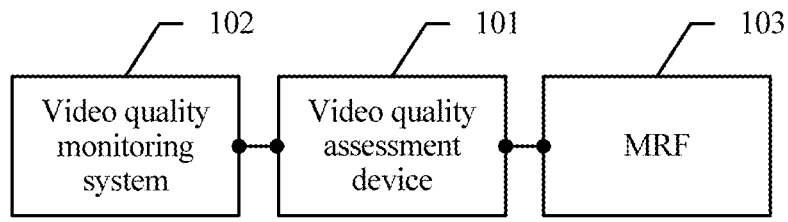
FIG. 1 is a schematic diagram of an IPTV video system architecture to which a video quality assessment method according to an embodiment of this application is applied.

A system architecture applicable to the method of the embodiments of this application is described first. FIG. 1 is a diagram of a system architecture to which a video quality assessment method according to an embodiment of this application is applied. The system architecture mainly includes a video quality assessment device 101, a video quality monitoring system 102, and a multimedia relay function (MRF) 103. The video quality monitoring system 102 is configured to deliver a monitoring instruction to the video quality assessment device 101. The video quality assessment device 101 may monitor video quality of a to-be-assessed video according to the monitoring instruction delivered by the video quality monitoring system 102. For example, the to-be-assessed video may be on-live video data or on-demand video data. The monitoring instruction delivered by the video quality monitoring system 102 may include a video identifier of the to-be-assessed video. The video identifier may be a channel number of a live video, or the video identifier may be a combination of a multicast address and a multicast port of a live video, or the video identifier may be 5-tuple data of an on-demand video. For example, the 5-tuple data refers to a source Internet Protocol (IP) address, a source port, a destination IP address, a destination port, and a transport layer protocol. For example, a live video stream sent on a video transmission channel is sent by the MRF to a receiving device of the to-be-assessed video. The receiving device of the to-be-assessed video is a device on a user side used for video decoding and playing, for example, an STB. The receiving device of the to-be-assessed video decodes the received live video stream and presents the decoded live video stream to a user, thereby providing a video service for the user. The MRF 103 may use an FEC technology to implement service assurance, thereby reducing adverse impact of a case, such as a packet loss or a bit error of video data during transmission, on decoding. The video quality assessment device 101 provided in this embodiment of this application may simulate FEC decoding on video data, so that the video quality assessment device 101 can perform video quality assessment on video data recovered from the FEC decoding, thereby making the video quality assessment more accurate and more consistent with real video experience of the user. In a subsequent embodiment, calculation of an MOSV of video data in a video on-live scenario is used as an example for description. For an implementation of an MOSV of video data in a video on-demand scenario, refer to a subsequent scenario.

Figure 2:
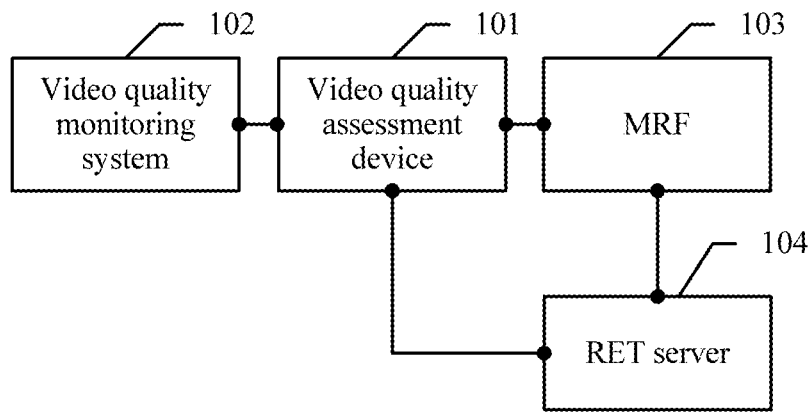
FIG. 2 is a schematic diagram of another IPTV video system architecture to which a video quality assessment method according to an embodiment of this application is applied.

In some other embodiments of this application, in addition to an FEC encoding technology, a service quality assurance system deployed by an operator may further use a retransmission (RET) technology, to reduce adverse impact of a case, such as a packet loss or a bit error of video data during transmission, on decoding. FIG. 2 is a diagram of another system architecture to which a video quality assessment method according to an embodiment of this application is applied. In addition to a video quality assessment device 101, a video quality monitoring system 102, and an MRF 103, the system architecture may further include an RET server 104. The RET server 104 may be separately connected to the MRF 103 and the video quality assessment device 101. The video quality assessment device 101 provided in this embodiment of this application further needs to consider a retransmission capability of the RET for a lost data packet, so that the video quality assessment device 101 can perform video quality assessment on video data recovered from FEC decoding and a data packet recovered after RET retransmission succeeds, thereby improving accuracy of the video quality assessment, and a calculated MOSV is more consistent with real video experience of a user.

Figure 3:
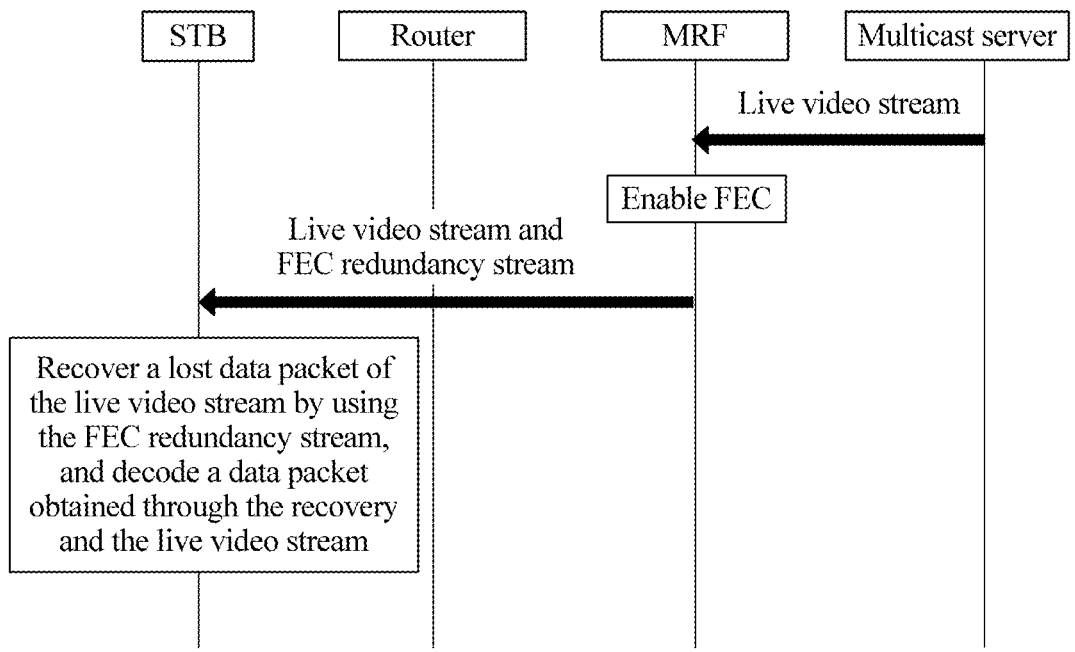
FIG. 3 is a schematic diagram of an FEC implementation process according to an embodiment of this application.

Referring to FIG. 3, the following describes an FEC implementation process provided in an embodiment of this application. An application layer FEC is mainly based on an erasure code. At a transmit end, source video data is partitioned into equal-sized data packets, and $k_1$ source data packets are encoded as $n_1$ ($n_1 > k_1$) data packets for sending. After network transmission, $m_1$ ($n_1 \geq m_1$) data packets are received at a receive end. The received data packets can be used to recover $k_1$ source data packets provided that a quantity of the received data packets is greater than or equal to a quantity of the source data packets, in other words, $m_1 \geq k_1$. An application layer FEC technology achieves an error tolerance effect in error control of streaming media transmission.

In some embodiments of this application, a basic solution of the FEC is to insert an FEC redundancy data packet into each live video stream on an MRF. When detecting a packet loss, an STB recovers a lost data packet as far as possible based on the FEC redundancy data packet and received video data. When an FEC function takes effect, the MRF sends two data streams, one data stream is an FEC redundancy stream, and the other data stream is a live video stream. The FEC redundancy stream and the live video stream have a same destination address. There is a particular relationship between destination ports of the FEC redundancy stream and the live video stream. For example, a destination port number of the FEC redundancy stream is a destination port number of the live video stream minus 1. If the destination port number of the live video stream is 2345, the destination port number of the FEC redundancy stream is 2344. When an RTP bearer is used, a payload type field of an RTP of the FEC redundancy stream is different from a payload type of an RTP of the live video stream, so that the STB identifies the FEC redundancy stream. A header data structure of the FEC redundancy data packet is as follows:

```
FEC_DATA_STRUCT
{
    UINT16 rtp_begin_seq;   //a start RTP sequence number of FEC encoding of a
source bitstream
    UINT16 rtp_end_seq;     //an end RTP sequence number of the FEC encoding
of the source bitstream
    UINT8 redund_num;       //FEC packet quantity
    UINT8 redund_idx;       //FEC packet index sequence number, starting from 0
    UINT16 fec_len;         //FEC payload byte quantity
    UINT16 rtp_len;         //a maximum length and a byte quantity of an
encoded RTP packet
    UINT16 rsv;             //reserved, all padded with 0s
    UINT8 fec_data[x];      //FEC data, used to perform FEC encoding on the RTP
packet
}
```

The following is an example of an FEC redundancy data packet. Table 1 shows a composition structure of the FEC redundancy data packet.

| De 31 De 94 | 05 | 00 | 05 30 | 05 30 | 00 | 00 80 ... |
|---|---|---|---|---|---|---|
| A start RTP sequence number of source code is 56881 | An end RTP sequence number of the source code is 56980 | One piece of source code has five redundancy packets in total | A $0^{th}$ redundancy packet sequence number corresponding to the source code | A byte quantity of an FEC payload is 1328 | A maximum length of an RTP in the source code | Spare FEC data |

The following uses examples to describe how to calculate an FEC source block size and FEC redundancy. The FEC source block size may be measured by using a quantity of RTP data packets into which the source block is encapsulated. As shown in Table 1, calculation may be performed based on the start RTP sequence number and the end RTP sequence number, to obtain a source block size being 56980−56881+1=100, and FEC redundancy=5/100=5%.

As shown in FIG. 3, a detailed FEC implementation procedure is as follows:

1. A multicast server sends a live video stream.
2. The MRF enables FEC, and inserts an FEC redundancy data packet.
3. The STB receives the live video stream and an FEC redundancy stream.
4. The STB recovers a lost data packet of the live video stream by using the FEC redundancy stream, and decodes a data packet obtained through the recovery and the live video stream.

Figure 4:
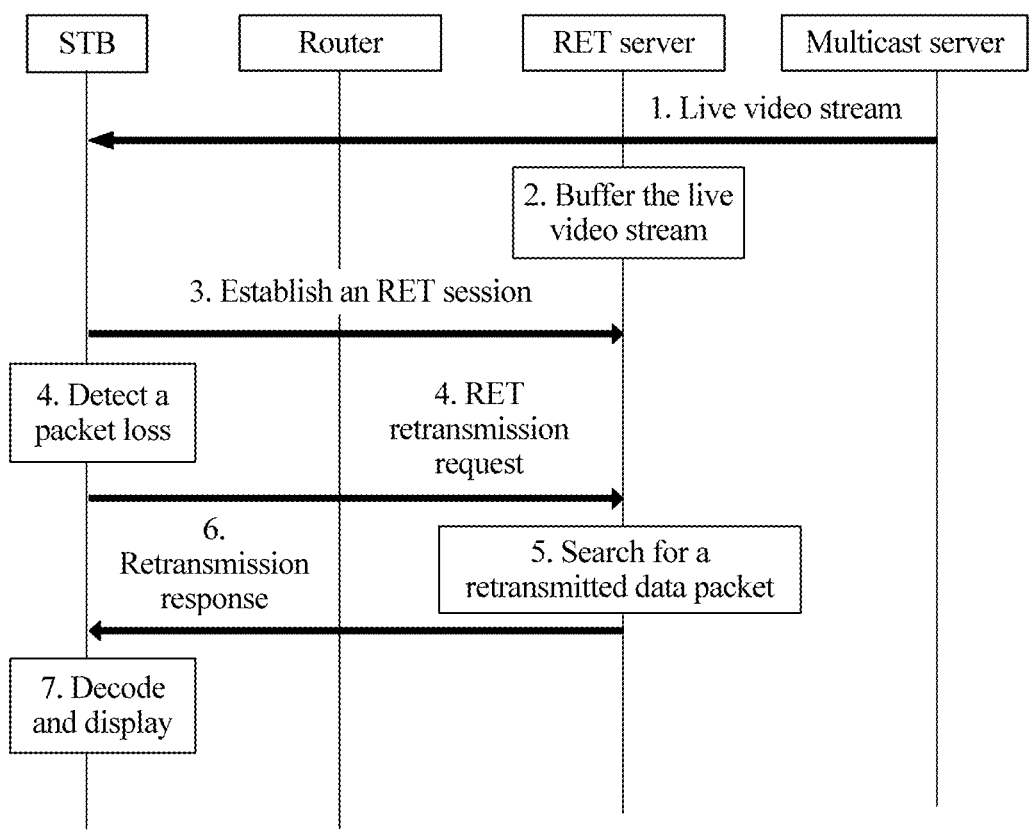
FIG. 4 is a schematic diagram of an RET implementation process according to an embodiment of this application.

In some embodiments of this application, referring to FIG. 4, the following describes an RET implementation process provided in an embodiment of this application. A basic solution of RET is that an RET server buffers video data of each video channel, when an STB detects a packet loss, the STB sends an RTP control protocol (RTCP) retransmission request to the RET server, and the RET server sends a retransmitted RTP data packet to the STB. The Internet Engineering Task Force (IETF) RFC 4585 defines a specific implementation form of a retransmission request. The IETF RFC 4588 specifies an RTP encapsulation format for retransmitting a data packet. As shown in FIG. 4, a detailed RET procedure is as follows:

1. A multicast server sends a live video stream. For example, the multicast server sends the live video stream to an MRF, and then the MRF forwards the live video stream to the RET server. The MRF is not shown in FIG. 4. The live video stream sent by the MRF to the RET server is used for buffering by the RET server.
2. The RET server receives the live video stream, and buffers the live video stream.
3. Establish, between the STB and the RET server, an RET session for retransmission.
4. The STB performs an error check and a loss check on received video data, and if finding a packet loss or an error packet, the STB sends a retransmission request to the RET server. According to the standard RFC 4585, one retransmission request may request to retransmit a plurality of data packets.
5. The RET server searches for a data packet in a video data buffer of a corresponding channel based on the received retransmission request, and sends a found data packet to the STB. The sent data packet may be encapsulated according to the RFC 4588.
6. The STB receives a retransmitted data packet, and then decodes and displays the received data packet.

Figure 5:
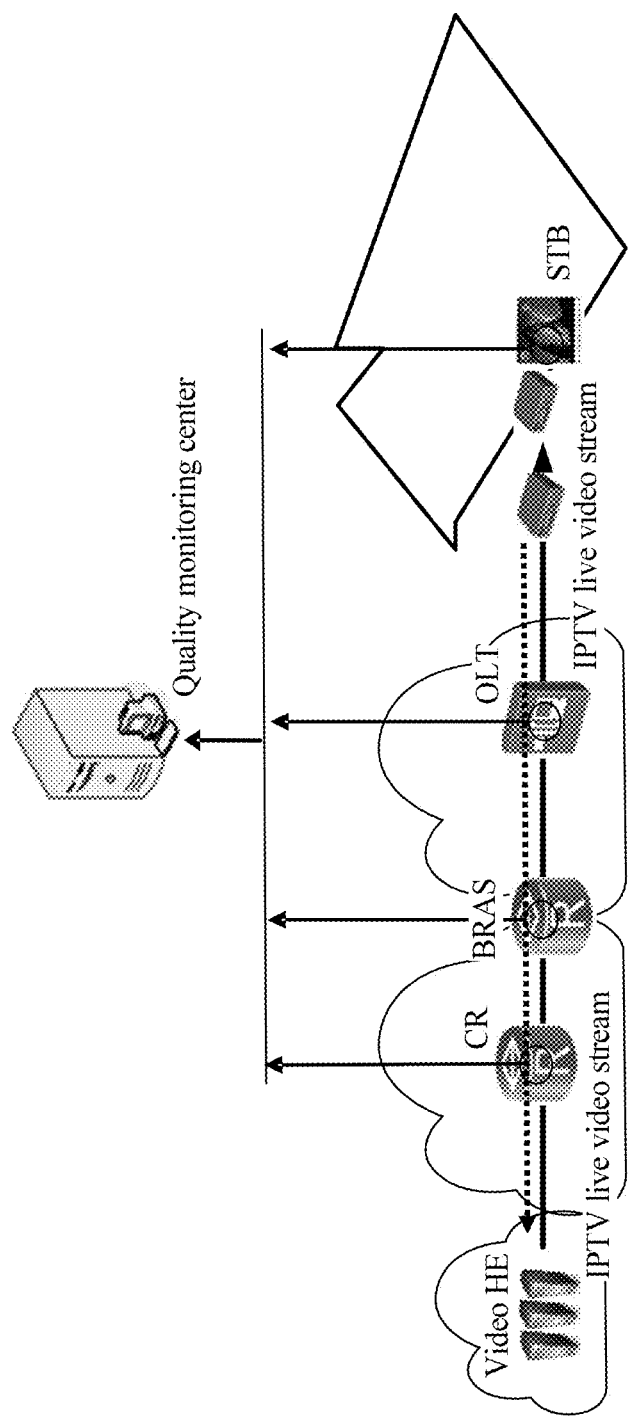
FIG. 5 is a schematic diagram of an application scenario of an IPTV video system according to an embodiment of this application.

The video quality assessment device provided in the embodiments of this application may be deployed as a probe on a router in FIG. 3 or FIG. 4. Alternatively, the video quality assessment device may be used as an independent network node and deployed in a video transmission network. In the embodiments of this application, when video quality assessment is performed on a network node, a recovery capability of FEC encoding for a lost data packet is considered, so that a calculated MOSV can reflect real video experience of a user. FIG. 5 is a diagram of a system architecture of an IPTV network to which a video quality assessment method according to an embodiment of this application is applied. Video HE is an IPTV video headend. Video data transcoded into video data of a constant bit rate is sent live or on-demand. When the video data is transferred from the video headend to a destination set top box, due to a status change of a network through which the video data passes, an exception such as a packet loss, a latency, jitter, or out-of-order may occur in the video data. The exceptions may cause a disadvantage such as artifact or frame freezing on a video image played on a terminal screen, resulting in degraded video viewing experience of a user.

In the embodiments of the present disclosure, the video quality assessment device is deployed in an end-to-end IPTV service scenario. The video quality assessment device may implement an MOSV probe by using software or hardware. The video quality assessment device is configured to monitor and calculate a video experience assessment score on a network node or of an IPTV service of a terminal user. As shown in FIG. 5, the video quality assessment device may be deployed as a probe on a network node such as a core router (CR), a broadband remote access server (BRAS), or an optical line terminal (OLT), or deployed in bypass mode on a network node such as a CR, a BRAS, or an OLT. Alternatively, the video quality assessment device may be deployed on a terminal device such as an IPTV STB.

The CR includes a central processing unit (CPU), a random access memory/dynamic random access memory (RAM/DRAM), a flash memory, a non-volatile random access memory (NVRAM), a read-only memory (ROM), and various interfaces. The MOSV probe may be deployed on the CPU. The BRAS includes a service management module and a service forwarding module. The MOSV probe may be deployed on a main control CPU of the service management module. The OLT includes a main control board, a service board, an interface board, a power board, and the like. The MOSV probe may be deployed on a CPU of the main control board.

Figure 6:
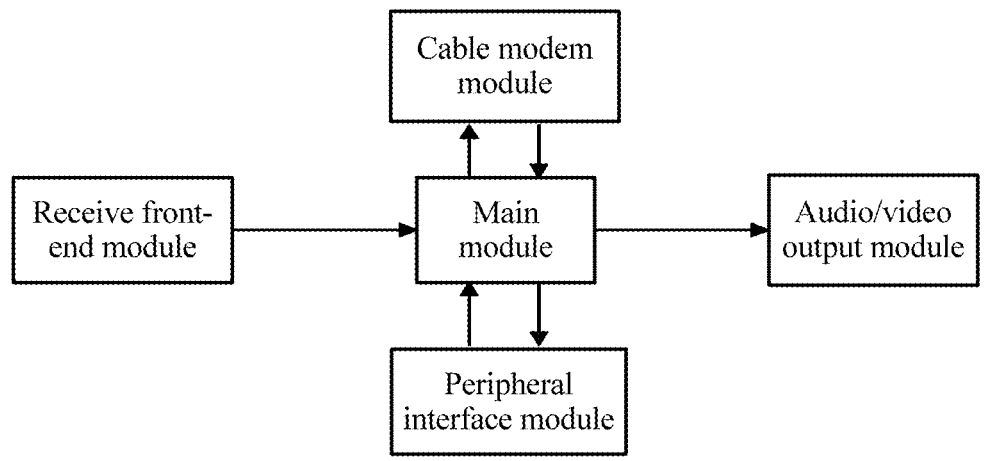
FIG. 6 is a schematic structural composition diagram of an STB according to an embodiment of this application.

As shown in FIG. 6, a composition structure of the STB may include five modules: a receive front-end module, a main module, a cable modem module, an audio/video output module, and a peripheral interface module. The receive front-end module includes a tuner and a quadrature amplitude modulation (QAM) demodulator, and this part may demodulate a video transport stream from a radio frequency signal. The main module is a core part of the entire STB. The main module includes a decoding part, an embedded CPU, and a memory. The decoding part may perform an operation such as decoding, decoding and multiplexing, or descrambling on a transport stream. The embedded CPU and the memory are configured to run and store a software system, and control modules. The MOSV probe is deployed on the embedded CPU. The cable modem module includes a two-way tuner, a downlink QAM demodulator, an uplink quadrature phase shift keying (QPSK)/QAM modulator, and a Media Access Control module, and this part implements all functions of cable modem. The audio/video output module performs digital/analog (D/A) conversion on an audio/video signal to restore an analog audio/video signal, and outputs the analog audio/video signal on a television. The peripheral interface module includes abundant external interfaces, including a high-speed serial interface, a universal serial interface USB, and the like.

Figure 7:
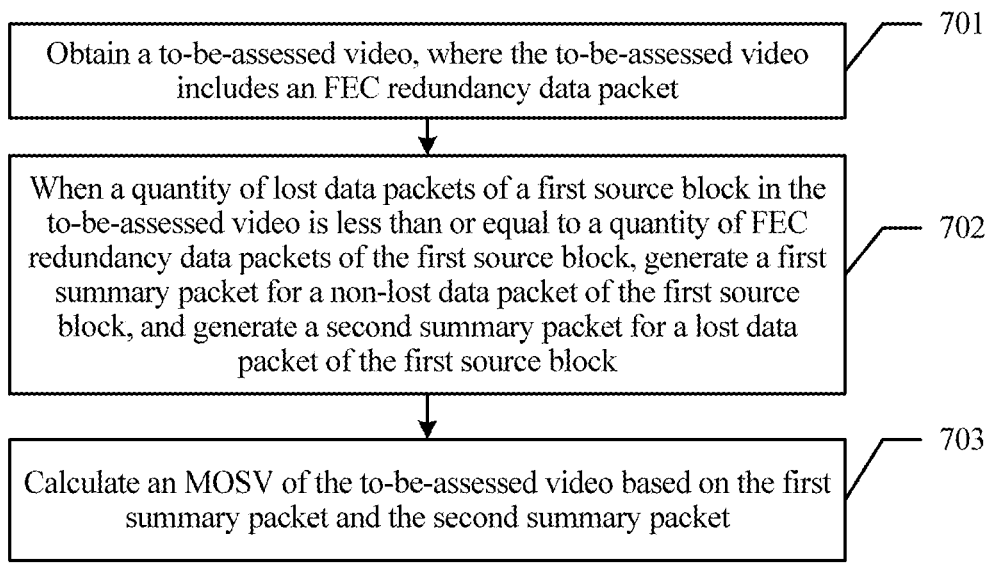
FIG. 7 is a schematic block diagram of a flowchart of a video quality assessment method according to an embodiment of this application.

The following describes in detail the video quality assessment method performed by the video quality assessment device in the embodiments of this application. Referring to FIG. 7, a video quality assessment method provided in an embodiment of this application mainly includes the following operations.

701. Obtain a to-be-assessed video, where the to-be-assessed video includes an FEC redundancy data packet.

The video quality assessment device may capture a to-be-assessed video from an MRF. The MRF may insert an FEC redundancy data packet into the to-be-assessed video. For details about a process of inserting the FEC redundancy data packet, refer to the description of the foregoing embodiment.

In some embodiments of this application, before the video quality assessment device performs operation 701, the video quality assessment method provided in this embodiment of this application may further include the following operations.

700A. Receive a monitoring instruction sent by a video quality monitoring system, where the monitoring instruction includes a video identifier of the to-be-assessed video.

In this embodiment of this application, the video quality assessment device first receives a monitoring instruction delivered by the video quality monitoring system to the video quality assessment device. The monitoring instruction includes a channel number of a live video, or the monitoring instruction includes a combination of a multicast address and a multicast port, or the video identifier may be 5-tuple data of an on-demand video. For example, the video quality assessment device may indicate a channel of a to-be-assessed video by using a synchronization source identifier (SSRC), a multicast address, and a multicast port. The SSRC may be used to capture the to-be-assessed video, or the multicast address and the multicast port may be used to capture the to-be-assessed video.

700B. Obtain video service information according to the monitoring instruction, where the video service information includes a video encoding configuration parameter and FEC capability information.

In this embodiment of this application, the video quality assessment device may perform video quality monitoring on a to-be-assessed video according to the monitoring instruction. The video quality assessment device first obtains video service information. The video service information is service information that needs to be used by the video quality assessment device to perform the video quality monitoring on the to-be-assessed video. The video service information includes a video encoding configuration parameter and FEC capability information. For example, the video encoding configuration parameter may be a video encoding type, a frame rate, resolution, or the like that is used by a multicast server to send a live video stream. The FEC capability information is FEC information used by the MRF when the MRF performs FEC encoding on the live video stream. For example, the FEC capability information may include an FEC source block size and FEC redundancy. The video quality assessment device may obtain the to-be-assessed video based on the video service information.

702. When a quantity of lost data packets of a first source block in the to-be-assessed video is less than or equal to a quantity of FEC redundancy data packets of the first source block, generate a first summary packet for a non-lost data packet of the first source block, and generate a second summary packet for a lost data packet of the first source block.

A loss may occur in the to-be-assessed video during transmission. In this embodiment of this application, processing of the first source block in the to-be-assessed video is used as an example for description. The first source block is a first video source block. Some data packets in the first source block may be lost during transmission. First, the quantity of lost data packets of the first source block in the first source block is obtained. A corresponding FEC redundancy data packet is inserted into the first source block when the first source block is transmitted by the MRF. Therefore, the quantity of FEC redundancy data packets of the first source block is counted. If the quantity of lost data packets of the first source block in the to-be-assessed video is less than or equal to the quantity of FEC redundancy data packets of the first source block, it indicates that the FEC redundancy data packet may be used to recover a lost data packet in the first source block. Summary packets are generated respectively for a non-lost data packet and a lost data packet of the first source block. For a structure of the summary packets, refer to a structure of stripped packets in the ITU-T P.1201.2 standard. For a manner of generating the summary packet, refer to a calculation manner performed by using the stripped packets in the ITU-T P.1201.2 standard. For ease of description, a summary packet generated for the non-lost data packet of the first source block is defined as "a first summary packet", and a summary packet generated for the lost data packet of the first source block is defined as "a second summary packet".

In some embodiments of this application, the quantity of lost data packets of the first source block is calculated in the following manner:

A1. Obtain a start RTP sequence number and an end RTP sequence number from the FEC redundancy data packet, and obtain an RTP sequence number of the non-lost data packet of the first source block.

A2. Calculate the quantity of lost data packets of the first source block based on the start RTP sequence number, the end RTP sequence number, and the RTP sequence number of the non-lost data packet of the first source block.

It can be learned from the foregoing example of the description of the FEC redundancy data packet that, a total quantity of RTP data packets in the first source block may be determined based on the start RTP sequence number and the end RTP sequence number, and then the quantity of lost data packets of the first source block may be calculated by excluding the RTP sequence number of the non-lost data packet.

In some embodiments of this application, in addition to the foregoing implementation operations, the video quality assessment method provided in this embodiment of this application may further include the following operations.

C1. Obtain FEC capability information of the first source block, where the FEC capability information includes an FEC source block size and FEC redundancy.

The video quality assessment device in this embodiment of this application may obtain the FEC capability information, to determine the quantity of FEC redundancy data packets of the first source block by using the FEC capability information.

In some embodiments of this application, operation C1 of obtaining an FEC source block size and FEC redundancy of the first source block includes:

C11. obtaining the FEC source block size and the FEC redundancy from the MRF or a receiving device of the to-be-assessed video; or C12. parsing a control packet of interaction between the receiving device of the to-be-assessed video and a video server, to obtain the FEC source block size and the FEC redundancy; or C13. parsing an FEC redundancy data packet of the first source block, to obtain the FEC source block size and the FEC redundancy.

There are various manners for the video quality assessment device to obtain the FEC capability information. For example, the video quality assessment device may obtain the FEC capability information from the MRF or the receiving device of the to-be-assessed video. The receiving device of the to-be-assessed video may be an STB. For example, the video quality assessment device may view an MRF configuration file, an STB manual, or the like to obtain the FEC source block size and the FEC redundancy. The FEC redundancy is a quantity of redundancy packets in each FEC source block. For another example, the video quality assessment device obtains the FEC capability information by parsing a control packet. The STB and the video server usually interact with each other by using the Real-Time Streaming Protocol (RTSP) or the Hypertext Transfer Protocol (HTTP), to mutually notify the FEC capability information, including the FEC source block size and the quantity of FEC redundancy packets, and can obtain the FEC capability information by parsing such a control packet. For another example, the video quality assessment device may alternatively obtain the FEC capability information by parsing the FEC redundancy data packet. The FEC redundancy data packet includes the FEC source block size and the FEC redundancy.

In some embodiments of this application, the second summary packet generated for the lost data packet of the first source block includes: an RTP sequence number and a payload size of the lost data packet of the first source block, and summary information of a video transport stream (TS) packet of the lost data packet of the first source block. The payload size of the lost data packet of the first source block may be obtained by multiplying the quantity of lost data packets and a size of the lost data packet. For a manner of generating the summary information of the video TS packet, refer to a manner of generating summary information by using stripped packets in the ITU-T P.1201.2 standard.

703. Calculate an MOSV of the to-be-assessed video based on the first summary packet and the second summary packet.

In this embodiment of this application, the video quality assessment device considers a recovery status of an FEC technology for the lost data packet of the to-be-assessed video, so that the MOSV of the to-be-assessed video can be calculated based on the first summary packet and the second summary packet. For a specific calculation method for the MOSV, refer to an MOSV calculation manner in the ITU-T P.1201.2 standard. For the MOSV calculated based on the first summary packet and the second summary packet in this embodiment of this application, the recovery status of the FEC technology for the lost data packet is considered, so that video quality assessment is more accurate and is made more consistent with real experience of a user.

In some embodiments of this application, in addition to the foregoing implementation operations, the video quality assessment method provided in this embodiment of this application may further include the following operations.

D1. When the quantity of lost data packets of the first source block is 0, or the quantity of lost data packets of the first source block is greater than the quantity of FEC redundancy data packets of the first source block, generate the first summary packet for the non-lost data packet of the first source block.

D2. Calculate the MOSV of the to-be-assessed video based on the first summary packet.

When the quantity of lost packets of the first source block is 0, it indicates that no data packet loss occurs in the first source block. When the quantity of lost data packets of the first source block is greater than the quantity of FEC redundancy data packets of the first source block, it indicates that the first source block cannot recover the lost data packet in the first source block by using the FEC redundancy data packet. In the two cases, the first summary packet is generated for the non-lost data packet of the first source block, and finally, the MOSV of the to-be-assessed video is calculated based on the first summary packet. Optionally, when the quantity of lost data packets of the first source block is 0, or the quantity of lost data packets of the first source block is greater than the quantity of FEC redundancy data packets of the first source block, the video quality assessment device may alternatively discard the FEC redundancy data packet of the first source block, to reduce occupation of an FEC buffer queue. Because the quantity of lost data packets of the first source block is 0, or the quantity of lost data packets of the first source block is greater than the quantity of FEC redundancy data packets of the first source block, the FEC technology cannot recover the lost data packet of the first source block. Therefore, the MOSV calculated by using only the first summary packet can indicate real video experience of a user.

In some embodiments of this application, as shown in FIG. 2, it is assumed that an RET server is further disposed in an IPTV video system. In addition to the foregoing implementation operations, the video quality assessment method provided in this embodiment of this application may further include the following operations.

E1. Receive a retransmission request sent by the receiving device of the to-be-assessed video to an RET server, where the retransmission request is used to request the RET server to retransmit a data packet that is lost and cannot be recovered through FEC.

E2. When a retransmission response returned by the RET server is received, generate a third summary packet for the data packet that is lost and cannot be recovered through FEC.

When both FEC and RET are deployed in the IPTV video system, the multicast server sends the to-be-assessed video to the MRF. The MRF generates a corresponding FEC redundancy data packet based on the to-be-assessed video. After generating the FEC redundancy data packet, the MRF sends the to-be-assessed video and the FEC redundancy data packet to the receiving device of the to-be-assessed video. In addition, the MRF sends the to-be-assessed video and the FEC redundancy data packet to the RET server. After receiving the to-be-assessed video and the FEC redundancy data packet from the MRF, the RET server stores the received to-be-assessed video and FEC redundancy data packet in a video data buffer. The video data buffer is used to buffer the to-be-assessed video and the FEC redundancy data packet, so that the RET server retransmits lost video data at request of the receiving device of the to-be-assessed video. For example, the to-be-assessed video includes the first source block and a second source block. If the lost data packet of the first source block can be successfully recovered by using the FEC technology, but a lost data packet of the second source block cannot be successfully recovered by using the FEC technology, the receiving device of the to-be-assessed video may request the RET server to retransmit the lost data packet of the second source block. When the video quality assessment device receives a retransmission response returned by the RET server, the video quality assessment device generates a third summary packet for a data packet that is lost and cannot be recovered through FEC. For a manner of generating the third summary packet, refer to the calculation manner performed by using the stripped packets in the ITU-T P.1201.2 standard.

In an implementation scenario of performing operations E1 and E2, operation 703 of calculating a mean opinion score of video (MOSV) of the to-be-assessed video based on the first summary packet and the second summary packet includes:

F1. Calculate the MOSV of the to-be-assessed video based on the first summary packet, the second summary packet, and the third summary packet.

In this embodiment of this application, the video quality assessment device considers recovery statuses of the FEC technology and the RET technology for the lost data packet of the to-be-assessed video, so that the MOSV of the to-be-assessed video can be calculated based on the first summary packet, the second summary packet, and the third summary packet. For a specific calculation method for the MOSV, refer to the ITU-T P.1201.2 standard. For the MOSV calculated based on the first summary packet, the second summary packet, and the third summary packet in this embodiment of this application, the recovery statuses of the FEC technology and the RET technology for the lost data packet are considered, so that video quality assessment is more accurate and is made more consistent with real experience of a user.

For example, after receiving the to-be-assessed video and the FEC redundancy data packet forwarded by the RET server, the STB uses the to-be-assessed video and the FEC redundancy data packet to detect whether a packet loss occurs. After detecting a packet loss, the STB uses the FEC redundancy data packet to recover the lost data packet as far as possible. If there are an excessive quantity of lost data packets, and FEC decoding fails, the STB sends a retransmission request to the RET server. The video quality assessment device obtains the retransmission request sent by the STB. The RET server sends a retransmission response to the STB based on the retransmission request sent by the STB. The video quality assessment device obtains the retransmission response, and determines, based on the retransmission response, that the lost data packet of the first source block is successfully recovered, so that the third summary packet of the data packet successfully retransmitted by the RET server can be calculated. In this case, the MOSV calculated based on the first summary packet, the second summary packet, and the third summary packet is needed. In this embodiment of this application, the recovery statuses of the FEC technology and the RET technology for the lost data packet are considered, so that video quality assessment is more accurate and is made more consistent with real experience of a user.

It can be learned from the description of the example of this embodiment of this application in the foregoing embodiment that, the to-be-assessed video is first obtained, where the to-be-assessed video includes the FEC redundancy data packet; when the quantity of lost data packets of the first source block in the to-be-assessed video is less than or equal to the quantity of FEC redundancy data packets of the first source block, the first summary packet is generated for the non-lost data packet of the first source block, and the second summary packet is generated for the lost data packet of the first source block; and finally, the mean opinion score of video (MOSV) of the to-be-assessed video is calculated based on the first summary packet and the second summary packet. In this embodiment of this application, because a data packet loss status of the first source block in the to-be-assessed video and a packet loss recovery status of the FEC redundancy data packet are considered, the first summary packet and the second summary packet are calculated, and the MOSV of the to-be-assessed video can be calculated based on the first summary packet and the second summary packet. Compared with the prior art in which an MOSV of only captured video data is assessed, in this embodiment of this application, a recovery capability of the FEC redundancy data packet for a lost data packet is considered.

Therefore, video quality assessment is more accurate and is made more consistent with real video experience of a user.

It should be noted that, in the foregoing embodiment of this application, a video quality impairment is mainly caused by video compression and a network transmission packet loss. A video compression impairment is related to a video bitrate, resolution, a frame rate, and content complexity. Therefore, the video compression impairment may be calculated based on the video bitrate, the resolution, the frame rate, and the content complexity. When a video is transmitted over a network, a packet loss may occur. The packet loss may cause a frame quality impairment of the video, and if the impaired frame is a reference frame, the impairment may continue to propagate backward. Therefore, during assessment of a network transmission impairment, a frame size, a frame type, and a frame packet loss event of the video need to be determined first. An impairment degree is assessed based on a size of the frame packet loss event and a location at which the packet loss occurs. Then, the network transmission impairment is calculated based on an impairment status. In addition, in this embodiment of this application, the video quality assessment device may alternatively obtain, by using the FEC technology and the RET technology, a lost data packet that can be successfully recovered, so that calculation can be finally performed by comprehensively using the video compression impairment, the network transmission impairment, and a lost packet recovery status to obtain a final MOSV. For the method for calculating the MOSV in this embodiment of this application, refer to a manner of calculating an MOSV by using stripped packets in the ITU-T P.1201.2 standard.

To help better understand and implement the foregoing solutions of this embodiment of this application, corresponding application scenarios are specifically described by way of example below.

Figure 8A:
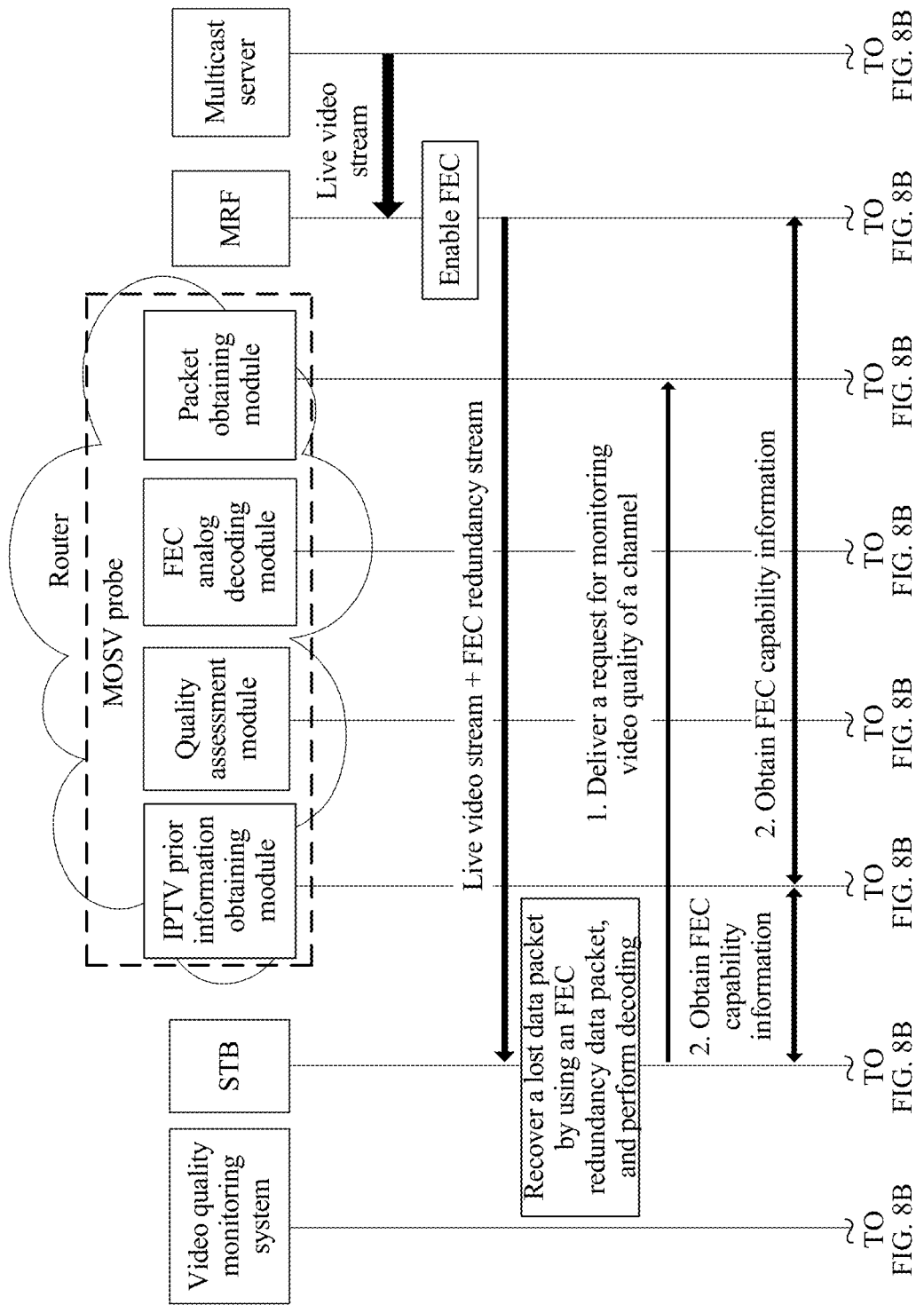
FIG. 8A and FIG. 8B are a schematic flowchart of interaction between network elements in an IPTV video system according to an embodiment of this application.
Figure 8B:
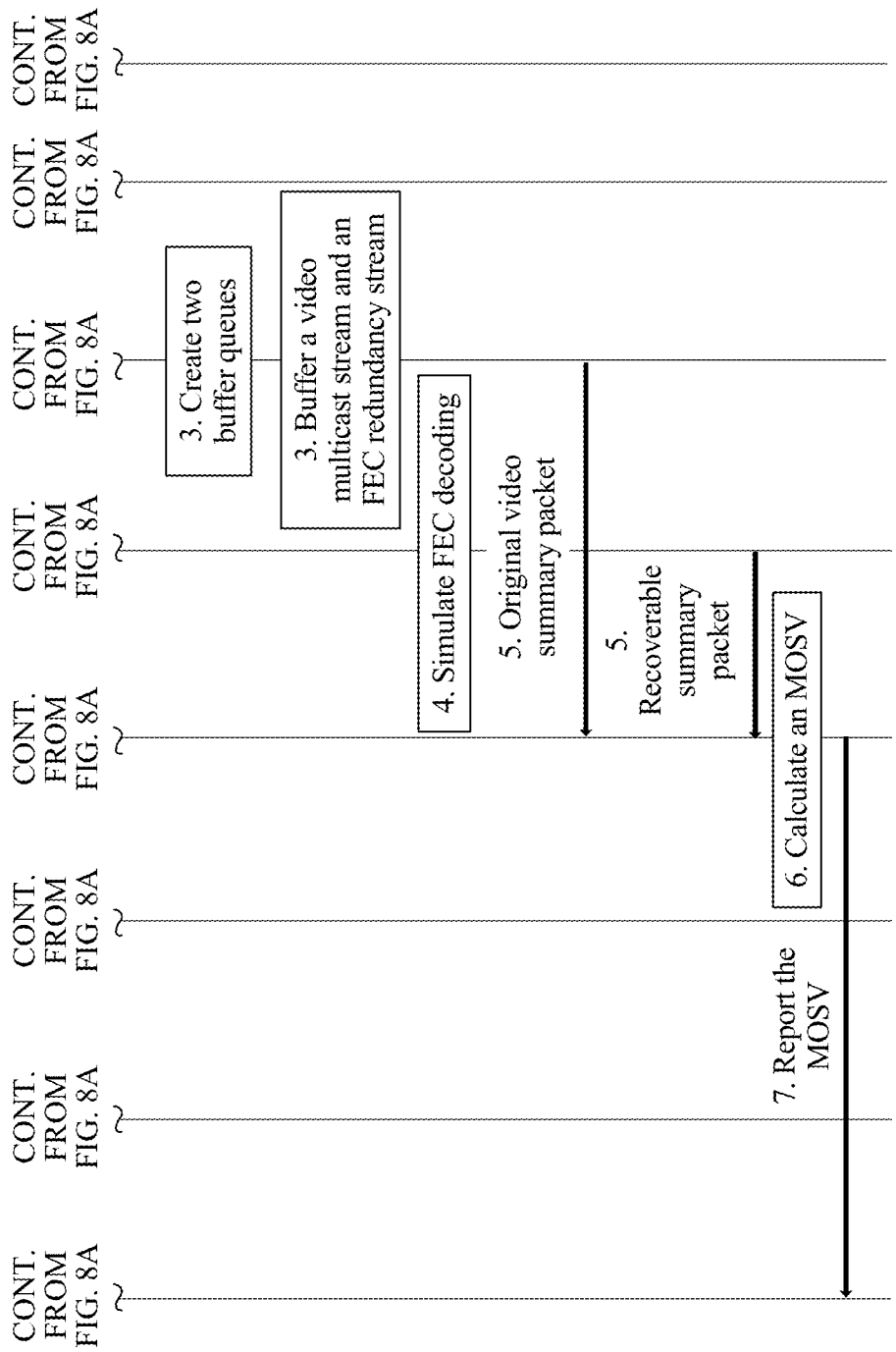

FIG. 8A and FIG. 8B are a schematic flowchart of interaction between network elements in an IPTV video system according to an embodiment of this application. In this embodiment of this application, a video quality assessment device is deployed as an MOSV probe on a network device (for example, a router). The video quality assessment device may obtain, through port mirroring, video data sent by a multicast server to a receiving device of a to-be-assessed video. The IPTV video system has an FEC function. The multicast server sends a live video stream to an MRF. The MRF enables the FEC function, and inserts an FEC redundancy stream. An STB receives the live video stream and the FEC redundancy stream, recovers a lost data packet of a video source block in the live video stream by using an FEC redundancy data packet, and decodes and displays the live video stream. In this embodiment of this application, a method for optimizing IPTV video quality assessment in the scenario is described. A method includes the following operations.

1. A video quality monitoring system delivers a monitoring instruction for a specific video channel to the MOSV probe, where the monitoring instruction may include an SSRC of the specific video channel, and the MOSV probe may capture a live video stream by using the SSRC. Alternatively, the monitoring instruction may include a multicast address and a multicast port of the specific video channel, and the MOSV probe may alternatively capture a live video stream by using the multicast address and the multicast port.

2. The MOSV probe obtains video service information. The video service information may include a video encoding configuration parameter of a headend and FEC capability information. The MOSV probe may obtain the video service information after operation 1, or may obtain the video service information in advance before operation 1. This is not limited herein. The video encoding configuration parameter of the headend may include an encoding type, a frame rate, resolution, or the like. There are three obtaining methods for the MOSV probe to obtain the FEC capability information. In a first method, the MOSV probe obtains the FEC capability information from the MRF or the STB. For example, the MOSV probe views an MRF configuration file, an STB manual, or the like, to obtain an FEC source block size and FEC redundancy. In a second method, the FEC capability information is obtained by parsing a control packet. The STB and the multicast server usually interact with each other by using the RTSP or the HTTP, to mutually notify FEC capabilities and parameters, including an FEC source block size and FEC redundancy. The FEC capability information can be obtained by parsing such a control packet. For example, during channel list obtaining, a ChannelFECPort parameter is added to support an FEC error correction function for a channel. ChannelFECPort indicates a port number of a channel supporting FEC. If the channel supports FEC, the port number is filled with a number; otherwise, the port number is empty. In a third method, the FEC capability information may alternatively be obtained by parsing an FEC redundancy data packet. A packet header of the FEC redundancy data packet includes an FEC source block size and FEC redundancy.

3. The MOSV probe may be further provided with two buffers, for respectively capturing the live video stream and an FEC redundancy stream. First, a live video stream and an FEC redundancy stream of a to-be-assessed channel are extracted based on a multicast address. Then, the live video stream is distinguished from the FEC redundancy stream based on a port or an RTP payload type. An original video data packet in the live video stream is parsed, to generate an original video summary packet, and the original video summary packet is placed in a buffer queue, to resolve an out-of-order problem.

4. Parse the FEC redundancy data packet, and simulate an FEC decoding process. First, a start RTP sequence number and an end RTP sequence number included in a structure of the FEC redundancy data packet are used to synchronize the original video data packet and the FEC redundancy data packet. A quantity n of lost packets in a source block is counted by using a packet RTP sequence number in a summary packet queue generated by using the original video data packet. If there is no packet loss in the source block, a corresponding FEC data packet in an FEC buffer queue is discarded, and then operation 6 is performed. If there is a packet loss in the source block, a quantity of received FEC redundancy data packets is counted to be m. When m<n, it indicates that the packet loss is beyond an FEC recovery capability, and a lost data packet of the current source block cannot be recovered. In this case, a corresponding FEC data packet in an FEC buffer queue is discarded, and operation 6 is performed based on the original video summary packet to perform assessment. When m≥n, it indicates that the lost data packet of the current source block can be recovered by using an FEC technology. The following operation 5 is performed, so that a summary packet similar to the original video summary packet can be generated for the lost data packet.

5. Generate a recoverable summary packet for a lost data packet that can be recovered through FEC. The recoverable summary packet mainly includes an RTP sequence number and a payload size of the lost data packet, summary information of a video TS packet, and the like. A total quantity l of lost data packets in one transmission process is determined based on an RTP sequence number of the original video summary packet. A total quantity k of lost video TS packets is determined based on the total quantity of lost data packets and a continuity counter identifier cc in the video TS packet. It is obtained through calculation that a quantity of lost video TS packets in each RTP is k/l. It is assumed that for each video TS packet, payloadLength=184, and for each RTP, payloadLength=184*k/l. A subsequent operation 6 is performed based on the original video summary packet and the recoverable summary packet to perform assessment. The following Table 2 provides a summary format of the original video summary packet and a summary format of the recoverable summary packet. For example, cc of a last video TS packet in a summary packet a is cc=3, cc of a first video TS packet in a summary packet c is cc=9, a recoverable summary packet b is consecutive with a and c, and a cc number of a video TS packet in the summary packet b is consecutive with cc numbers of video TS packets in a and c. Therefore, cc numbers of video TS packets in the summary packet b are 4 to 8, and a quantity of lost video TS packets is 9−3−1=5. a and c are two consecutive summary packets. It can be learned by subtracting RTP sequence numbers of summary packets that, in one transmission process, the total quantity l of lost data packets is l=4552−4550−1=1, the total quantity k of lost video TS packets is k=9−3−1=5, and for an RTP of a lost packet, payloadLength=184*5/1=920. The summary packet b of the lost data packet can be generated by using the foregoing information.

6. Calculate an MOSV based on a to-be-assessed summary packet after the to-be-assessed summary packet is extracted from the queue, where the to-be-assessed summary packet may include the original video summary packet or the recoverable summary packet.

7. Report a video quality assessment result to the video quality monitoring system.

Table 2 shows content of the summary packets.

| Original video summary packet a | Recoverable summary packet b | Original video summary packet c |
|---|---|---|
| udpPktData { payloadSize = 692 sequenceNr = 4550 lastVideoCC = 3 videoTSPkt { cc = 0 payloadLength = 140 randomAccess = 1 pts = 400 dts = 400 frameType = P } ............ videoTSPkt { cc = 3 payloadLength = 184 } } | udpPktData { payloadSize = 920 sequenceNr = 4551 lastVideoCC = 8 videoTSPkt { cc = 4 payloadLength = 184 } ............ videoTSPkt { cc = 8 payloadLength = 184 } } | udpPktData { payloadSize = 1104 sequenceNr = 4552 lastVideoCC = 14 videoTSPkt { cc = 9 payloadLength = 184 } ............ videoTSPkt { cc = 14 payloadLength = 184 } } |

Figure 9A:
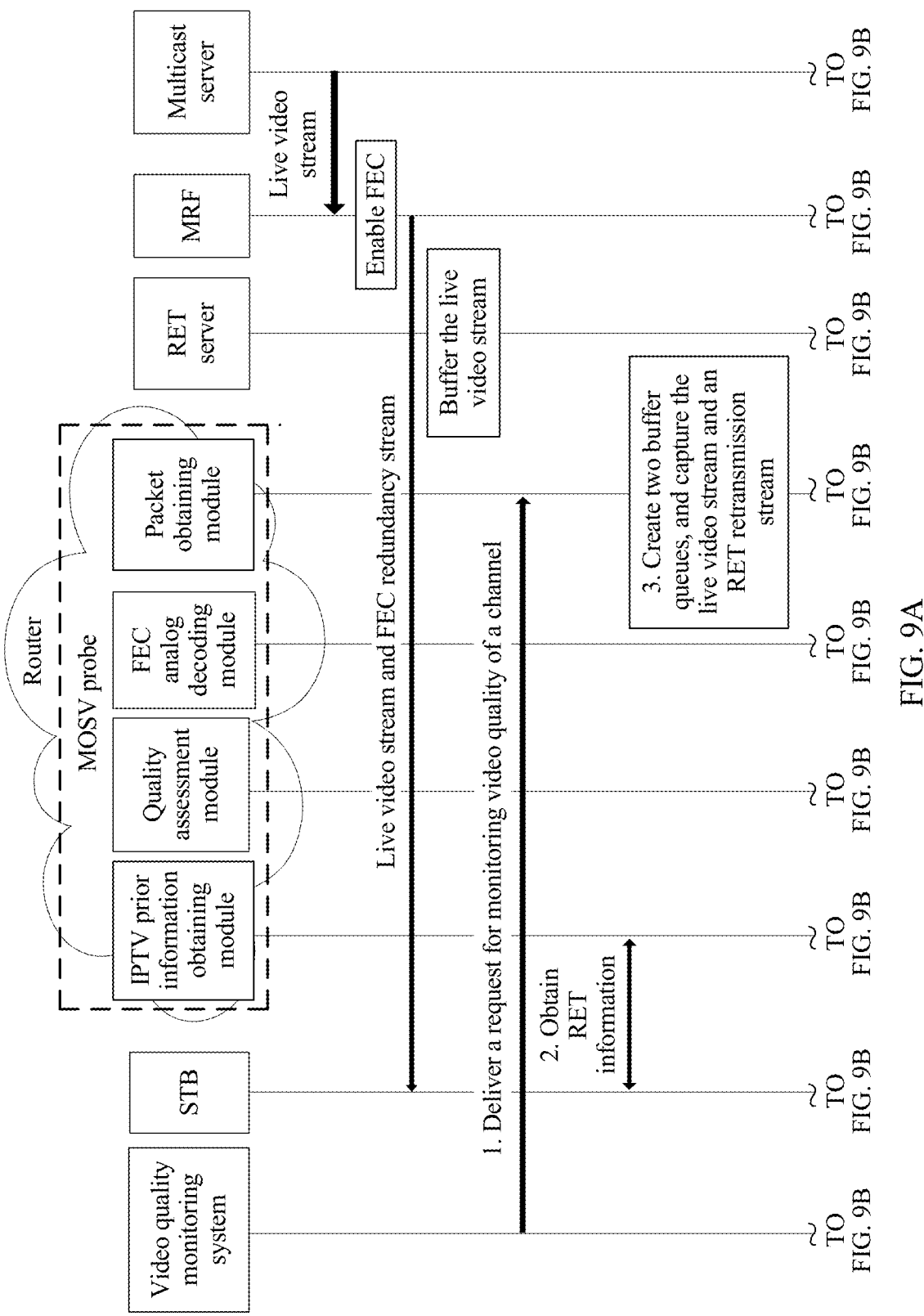
FIG. 9A and FIG. 9B are another schematic flowchart of interaction between network elements in an IPTV video system according to an embodiment of this application.
Figure 9B:
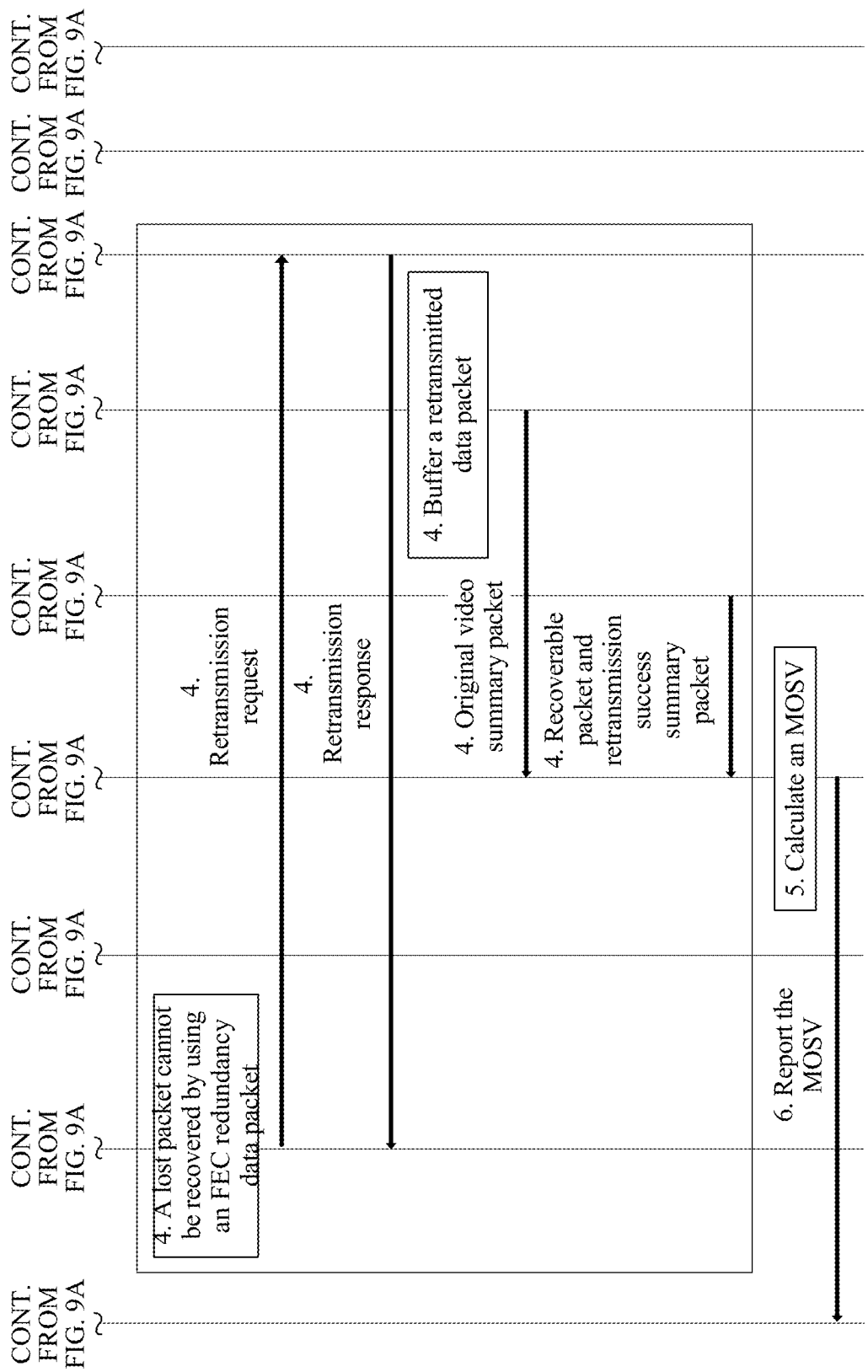

FIG. 9A and FIG. 9B are a schematic flowchart of interaction between network elements in an IPTV video system according to an embodiment of this application. When both FEC and RET are used in the IPTV video system, after an STB detects a packet loss, the STB first recovers a lost data packet as far as possible by using an FEC redundancy data packet. If FEC decoding fails because there are an excessive quantity of lost packets, the STB sends a retransmission request to an RET server, to obtain a lost data packet. In this case, during assessment of user video experience, recovery capabilities of both the FEC and the RET for a packet loss need to be considered. A method is as follows:

1. A video quality monitoring system delivers a monitoring instruction for a specific video channel to an MOSV probe, where the monitoring instruction may include an SSRC and a specific user (for example, an IP address of user equipment) of the specific video channel, and the MOSV probe may capture a live video stream by using the SSRC. Alternatively, the monitoring instruction may include a multicast address, a multicast port, and a specific user (for example, an IP address of user equipment) of the specific video channel, and the MOSV probe may alternatively capture a live video stream by using the multicast address and the multicast port. The IP address of the user equipment is used to capture a unicast retransmission request and a unicast retransmission response stream.

2. The MOSV probe obtains RET information. The RET information may include information indicating whether the STB enables RET, an RET server address, or the like.

3. The MOSV probe is provided with two buffers, for respectively capturing the live video stream and an RET retransmission stream. First, a live video stream of a to-be-assessed channel is filtered based on the multicast address, and then the RET retransmission stream is captured by using the IP address of the user equipment, where the RET retransmission stream includes a retransmission request and a retransmission response.

4. The MOSV probe separately generates a summary packet for a data packet that can be recovered or that is successfully retransmitted. After detecting a packet loss, the STB first recovers a lost data packet by using an FEC redundancy data packet. If the lost data packet cannot be recovered by using the FEC redundancy data packet, the STB initiates a retransmission request to the RET server. Therefore, the MOSV probe can determine, based on the retransmission request, whether the lost data packet is recovered by using the FEC redundancy data packet. If the retransmission request for the lost data packet is received, it indicates that the lost data packet cannot be recovered. If no retransmission request for the lost data packet is received, it indicates that the lost data packet has been recovered by using the FEC redundancy data packet. For a lost data packet that is recovered by using the FEC redundancy data packet, operation 5 in the foregoing embodiment may be performed, to generate a recoverable summary packet. For a lost data packet for which a retransmission request and a corresponding retransmission response are received, operation 5 in the foregoing embodiment may also be performed, to generate a retransmission success summary packet.

5. Calculate an MOSV based on a to-be-assessed summary packet after the to-be-assessed summary packet is extracted from the queue, where the to-be-assessed summary packet may include an original video summary packet, the recoverable summary packet, and the retransmission success summary packet.

6. Report a video quality assessment result to the video quality monitoring system.

It can be learned from the foregoing example that, in this embodiment of this application, a video quality assessment device obtains related parameters of the to-be-assessed channel, including the multicast address, the multicast port, an FEC source block size, a quantity of FEC redundancy packets, the RET server address, and the like. If the system enables only an FEC function, in addition to a live video stream, the video quality assessment device further needs to obtain an FEC redundancy stream, count a quantity of received FEC redundancy data packets and a quantity of lost data packets for each video source block, and determine, based on this, whether a lost data packet in a current source block can be recovered. When the lost data packet can be recovered by using an FEC redundancy data packet, a corresponding recoverable summary packet needs to be created for the lost data packet and inserted into an original video summary packet queue, for calculating an MOSV of a to-be-assessed video. If the system enables both FEC and RET functions, the video quality assessment device needs to monitor an RET retransmission stream, and needs to generate a corresponding retransmission success summary packet for a successfully retransmitted data packet and insert the retransmission success summary packet into an original video summary packet queue, for calculating an MOSV of a to-be-assessed video. The video quality assessment device extracts a summary packet from a summary packet queue, obtains a related video attribute through analysis, and finally calculates an MOSV value of the channel. In this technical solution of this application, FEC and RET technologies used in a service quality assurance system are considered. Based on an original assessment method, impact of an FEC redundancy data packet and an RET retransmission data packet on a lost data packet is considered, so that video quality assessment is more accurate and is made more consistent with real experience of a user. In this embodiment of this application, when video quality assessment is performed on a network node, FEC and RET error tolerance capabilities are considered, so that the video quality assessment is more accurate and can reflect real user experience.

It should be noted that, for brief description, the foregoing method embodiments are represented as a series of actions. However, a person skilled in the art should know that this application is not limited to the described order of the actions, because according to this application, some operations may be performed in other orders or simultaneously. It should be further known by a person skilled in the art that the embodiments described in this specification all are examples of embodiments, and the actions and modules in the embodiments are not necessarily required by this application.

To better implement the foregoing solutions of the embodiments of this application, the following further provides related apparatuses for implementing the foregoing solutions.

Referring to FIG. 10-a, a video quality assessment device 1000 provided in an embodiment of this application may include a video obtaining module 1001, a summary generation module 1002, and a video assessment module 1003.

The video obtaining module 1001 is configured to obtain a to-be-assessed video, where the to-be-assessed video includes a forward error correction (FEC) redundancy data packet.

The summary generation module 1002 is configured to: when a quantity of lost data packets of a first source block in the to-be-assessed video is less than or equal to a quantity of FEC redundancy data packets of the first source block, generate a first summary packet for a non-lost data packet of the first source block, and generate a second summary packet for a lost data packet of the first source block.

The video assessment module 1003 is configured to calculate a mean opinion score of video (MOSV) of the to-be-assessed video based on the first summary packet and the second summary packet.

In some embodiments of this application, referring to FIG. 10-b, the summary generation module 1002 includes: a sequence number obtaining module 10021, configured to: obtain a start Real-Time Transport Protocol (RTP) sequence number and an end RTP sequence number from the FEC redundancy data packet, and obtain an RTP sequence number of the non-lost data packet of the first source block; and a packet loss measurement module 10022, configured to calculate the quantity of lost data packets of the first source block based on the start RTP sequence number, the end RTP sequence number, and the RTP sequence number of the non-lost data packet of the first source block.

In some embodiments of this application, referring to FIG. 10-c, the video quality assessment device 1000 further includes:

an FEC information obtaining module 1004, configured to obtain an FEC source block size and FEC redundancy of the first source block.

Further, in some embodiments of this application, the FEC information obtaining module 1004 is configured to: obtain the FEC source block size and the FEC redundancy from the MRF or a receiving device of the to-be-assessed video; or parse a control packet of interaction between the receiving device of the to-be-assessed video and a video server, to obtain the FEC source block size and the FEC redundancy; or parse an FEC redundancy data packet of the first source block, to obtain the FEC source block size and the FEC redundancy.

In some embodiments of this application, the summary generation module 1002 is further configured to: when the quantity of lost data packets of the first source block is 0, or the quantity of lost data packets of the first source block is greater than the quantity of FEC redundancy data packets of the first source block, generate the first summary packet for the non-lost data packet of the first source block; and the video assessment module 1003 is further configured to calculate the MOSV of the to-be-assessed video based on the first summary packet.

In some embodiments of this application, referring to FIG. 10-d, the video quality assessment device further includes: a receiving module 1005, configured to receive a retransmission request sent by the receiving device of the to-be-assessed video to a retransmission (RET) server, where the retransmission request is used to request the RET server to retransmit a data packet that is lost and cannot be recovered through FEC; the summary generation module 1002 is further configured to: when a retransmission response returned by the RET server is received, generate a third summary packet for the data packet that is lost and cannot be recovered through FEC; and the video assessment module 1003 is configured to calculate the MOSV of the to-be-assessed video based on the first summary packet, the second summary packet, and the third summary packet.

In some embodiments of this application, the second summary packet includes: an RTP sequence number and a payload size of the lost data packet of the first source block, and summary information of a video transport stream (TS) packet of the lost data packet of the first source block.

It can be learned from the description of the example of this application in the foregoing embodiment that, the to-be-assessed video is first obtained, where the to-be-assessed video includes the FEC redundancy data packet; when the quantity of lost data packets of the first source block in the to-be-assessed video is less than or equal to the quantity of FEC redundancy data packets of the first source block, the first summary packet is generated for the non-lost data packet of the first source block, and the second summary packet is generated for the lost data packet of the first source block; and finally, the mean opinion score of video (MOSV) of the to-be-assessed video is calculated based on the first summary packet and the second summary packet. In this embodiment of this application, because a data packet loss status of the first source block in the to-be-assessed video and a packet loss recovery status of the FEC redundancy data packet are considered, the first summary packet and the second summary packet are calculated, and the MOSV of the to-be-assessed video can be calculated based on the first summary packet and the second summary packet. Compared with the prior art in which an MOSV of only captured video data is assessed, in this embodiment of this application, a recovery capability of the FEC redundancy data packet for a lost data packet is considered. Therefore, video quality assessment is more accurate and is made more consistent with real video experience of a user.

It should be noted that content such as information exchange between the modules/units of the apparatus and the execution processes thereof is based on the same idea as the method embodiments of this application, and produces the same technical effects as the method embodiments of this application. For the specific content, refer to the foregoing description in the method embodiments of this application, and the details are not described herein again.

An embodiment of this application further provides a computer storage medium. The computer storage medium stores a program. The program performs some or all operations recorded in the foregoing method embodiments.

Figure 11:
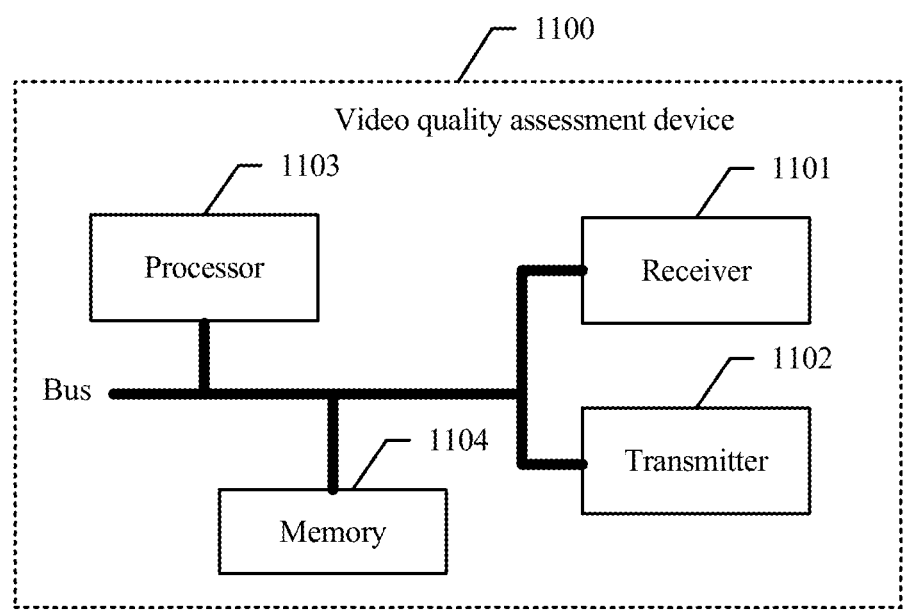
FIG. 11 is a schematic structural composition diagram of another video quality assessment device according to an embodiment of this application.

The following describes another video quality assessment device provided in an embodiment of this application. Referring to FIG. 11, the video quality assessment device 1100 includes a receiver 1101, a transmitter 1102, a processor 1103, and a memory 1104 (where there may be one or more processors 1103 in the video quality assessment device 1100, and in FIG. 11, for example, there is one processor in the video quality assessment device 1100). In some embodiments of this application, the receiver 1101, the transmitter 1102, the processor 1103, and the memory 1104 may be connected by using a bus or in another manner. In FIG. 11, for example, the receiver 1101, the transmitter 1102, the processor 1103, and the memory 1104 are connected by using a bus.

The memory 1104 may include a read-only memory and a random access memory, and provide an instruction and data to the processor 1103. A part of the memory 1104 may further include a non-volatile random access memory (NVRAM). The memory 1104 stores an operating system and an operation instruction, an executable module or data structure, or a subnet thereof, or an extended set thereof. The operation instruction may include various operation instructions, for implementing various operations. The operating system may include various system programs, for implementing various basic services and processing hardware-based tasks.

The processor 1103 controls an operation of the video quality assessment device. The processor 1103 may further be referred to as a central processing unit (CPU). In a specific application, components of the video quality assessment device are coupled together by using a bus system. In addition to a data bus, the bus system may further include a power bus, a control bus, a status signal bus, or the like. However, for clear description, various types of buses in the figure are marked as the bus system.

The method disclosed in the foregoing embodiments of this application may be applied to the processor 1103, or may be implemented by the processor 1103. The processor 1103 may be an integrated circuit chip and has a signal processing capability. In an implementation process, operations in the foregoing methods can be implemented by using a hardware integrated logic circuit in the processor 1103, or by using instructions in a form of software. The processor 1103 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor 1103 may implement or perform the methods, the operations, and logical block diagrams that are disclosed in the embodiments of this application. The general-purpose processor may be a microprocessor, or the processor may be any conventional processor or the like. Operations of the methods disclosed with reference to the embodiments of this application may be directly executed and accomplished by a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory 1104, and the processor 1103 reads information in the memory 1104 and completes the operations in the foregoing methods in combination with hardware of the processor 1103.

The receiver 1101 may be configured to receive input digit or character information, and generate a signal input related to a related setting and function control of the video quality assessment device. The transmitter 1102 may include a display device such as a display screen. The transmitter 1102 may be configured to output digit or character information through an external interface.

In this embodiment of this application, the processor 1103 is configured to execute the instruction in the memory, to perform the video quality assessment method described in the foregoing embodiments.

In addition, it should be noted that the described apparatus embodiment is merely an example. The units described as separate parts may or may not be physically separate, and parts displayed as units may or may not be physical units, may be located in one position, or may be distributed on a plurality of network units. Some or all of the modules may be selected based on actual needs to achieve the objectives of the solutions of the embodiments. In addition, in the accompanying drawings of the apparatus embodiments provided in this application, connection relationships between modules indicate that the modules have communication connections with each other, which may be implemented as one or more communications buses or signal cables.

Based on the description of the foregoing implementations, a person skilled in the art may clearly understand that this application may be implemented by software in addition to necessary universal hardware, or by dedicated hardware, including an application-specific integrated circuit, a dedicated CPU, a dedicated memory, a dedicated component, and the like. Generally, any functions that can be performed by a computer program can be easily implemented by using corresponding hardware. Moreover, a hardware structure used to achieve a same function may be of various forms, for example, in a form of an analog circuit, a digital circuit, or a dedicated circuit. However, as for this application, a software program implementation is a better implementation in most cases. Based on such an understanding, the technical solutions of this application essentially or the part contributing to the prior art may be implemented in a form of a software product. The computer software product is stored in a readable storage medium, such as a floppy disk, a USB flash drive, a removable hard disk, a read-only memory (ROM), a random access memory (RAM), a magnetic disk, or an optical disc of a computer, and includes several instructions for enabling a computer device (which may be a personal computer, a server, a network device, or the like) to perform the methods described in the embodiments of this application.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be stored by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. A video quality assessment method, comprising:
    obtaining a first to-be-assessed video, wherein the first to-be-assessed video comprises one or more forward error correction (FEC) redundancy data packets;
    obtaining an FEC source block size and the one or more FEC redundancy data packets from a multimedia relay function (MRF) system, or from a receiving device of the to-be-assessed video or by parsing FEC redundancy data packets of a first source block;
    when a quantity of lost data packets of the first source block in the first to-be-assessed video is less than or equal to a quantity of FEC redundancy data packets of the first source block, generating a first summary packet for one or more non-lost data packets of the first source block, and generating a second summary packet for a lost data packet of the first source block based on the one or more non-lost data packets, a Real-Time Transport Protocol (RTP) sequence number and a payload size of the lost data packet obtained by multiplying the quantity of lost data packets and the payload size of the lost data packets,
    wherein the quantity of lost data packet of the first source block is calculated based on a start RTP sequence number, an end RTP sequence number, and the RTP sequence number of the non-lost data packet of the first source block,
    wherein a total quantity of RTP data packets in the first source block is determined based on the start RTP sequence number and the end RTP sequence number, and
    wherein the quantity of lost data packets of the first source block is calculated based on the total quantity of RTP data packets in the first source block excluding the quantity of non-lost data packet of the first source block; and
    calculating a first score of video of the first to-be-assessed video based on the first summary packet and the second summary packet.

2. The method according to claim 1, wherein the quantity of lost data packets of the first source block is calculated in the following manner:
    obtaining the RTP sequence number and the end RTP sequence number from the one or more FEC redundancy data packets, and
    obtaining the RTP sequence number of the one or more non-lost data packets of the first source block.

3. The method according to claim 1, wherein the obtaining an FEC source block size and FEC redundancy of the first source block comprises: parsing a control packet of interaction between the receiving device of the to-be-assessed video and a video server, to obtain the FEC source block size and the FEC redundancy.

4. The method according to claim 1, wherein the obtaining an FEC source block size and FEC redundancy of the first source block comprises: parsing an FEC redundancy data packet of the first source block, to obtain the FEC source block size and the FEC redundancy.

5. The method according to claim 1, wherein the method further comprises:
    obtaining a second to-be-assessed video, wherein the second to-be-assessed video comprises an FEC redundancy data packet;
    when a quantity of lost data packets of a second source block in the second to be assessed video is 0, generating a third summary packet for a non-lost data packet of the second source block; and
    calculating a second score of the second to-be-assessed video based on the third summary packet.

6. The method according to claim 1, wherein the method further comprises:
    obtaining a third to-be-assessed video, wherein the third to-be-assessed video comprises an FEC redundancy data packet;
    when a quantity of lost data packets of a third source block in the third to-be-assessed video is greater than the quantity of FEC redundancy data packets of the third source block, generating a fourth summary packet for a non-lost data packet of the third source block; and
    calculating a third score of the third to-be-assessed video based on the fourth summary packet.

7. The method according to claim 1, wherein the method further comprises:
    receiving a retransmission request sent by a receiving device of the to-be-assessed video to a retransmission (RET) server, wherein the retransmission request is used to request the RET server to retransmit a data packet that is lost and cannot be recovered through FEC; and
    when a retransmission response returned by the RET server is received, generating a third summary packet for the data packet that is lost and cannot be recovered through FEC; and the calculating the first score of video of the first to-be-assessed video based on the first summary packet and the second summary packet comprises:
calculating the first score of the to-be-assessed video based on the first summary packet, the second summary packet, and the third summary packet.

8. The method according to claim 1, wherein the second summary packet comprises: an RTP sequence number and the payload size of the lost data packet of the first source block, and summary information of a video transport stream (TS) packet of the lost data packet of the first source block.

9. A video quality assessment method, comprising:
obtaining a to-be-assessed video, wherein the to-be-assessed video comprises a forward error correction (FEC) redundancy data packet;
obtaining an FEC source block size and the one or more FEC redundancy data packets from a multimedia relay function (MRF) system, or from a receiving device of the to-be-assessed video or by parsing FEC redundancy data packets of a first source block;
when a quantity of lost data packets of the first source block in the to-be-assessed video is 0, or the quantity of lost data packets of the first source block is greater than a quantity of FEC redundancy data packets of the first source block, generating a first summary packet for one or more non-lost data packets of the first source block, and generating a second summary packet for a lost data packet of the first source block based on the one or more non-lost data packets, a Real-Time Transport Protocol (RTP) sequence number and a payload size of the lost data packet obtained by multiplying the quantity of lost data packets and the payload size of the lost data packets,
wherein the quantity of lost data packet of the first source block is calculated based on a start RTP sequence number, an end RTP sequence number, and the RTP sequence number of the non-lost data packet of the first source block,
wherein a total quantity of RTP data packets in the first source block is determined based on the start RTP sequence number and the end RTP sequence number, and
wherein the quantity of lost data packets of the first source block is calculated based on the total quantity of RTP data packets in the first source block excluding the quantity of non-lost data packet of the first source block; and
calculating a first score of video of the to-be-assessed video based on the first summary packet.

10. A video quality assessment device comprising:
a processor; and
a non-transitory computer readable medium which contains computer-executable instructions;
the processor is configured to execute the computer-executable instructions to enable the video quality assessment device to perform operations comprising:
obtaining a to-be-assessed video, wherein the to-be-assessed video comprises one or more forward error correction (FEC) redundancy data packets;
obtaining an FEC source block size and the one or more FEC redundancy data packets from a multimedia relay function (MRF) system, or from a receiving device of the to-be-assessed video or by parsing FEC redundancy data packets of a first source block;
when a quantity of lost data packets of the first source block in the to-be-assessed video is less than or equal to a quantity of FEC redundancy data packets of the first source block, generating a first summary packet for one or more non-lost data packets of the first source block, and generating a second summary packet for a lost data packet of the first source block based on the one or more non-lost data packets, a Real-Time Transport Protocol (RTP) sequence number and a payload size of the lost data packet obtained by multiplying the quantity of lost data packets and the payload size of the lost data packets,
wherein the quantity of lost data packet of the first source block is calculated based on a start RTP sequence number, an end RTP sequence number, and the RTP sequence number of the non-lost data packet of the first source block,
wherein a total quantity of RTP data packets in the first source block is determined based on the start RTP sequence number and the end RTP sequence number, and
wherein the quantity of lost data packets of the first source block is calculated based on the total quantity of RTP data packets in the first source block excluding the quantity of non-lost data packet of the first source block; and
calculating a first score of video of the to-be-assessed video based on the first summary packet and the second summary packet.

11. The video quality assessment device according to claim 10, wherein the quantity of lost data packets of the first source block is calculated in the following manner:
obtaining the RTP sequence number and the end RTP sequence number from one or more FEC redundancy data packets, and
obtaining the RTP sequence number of one or more non-lost data packets of the first source block.

12. The video quality assessment device according to claim 10, wherein the obtaining the FEC source block size and FEC redundancy of the first source block comprises:
parsing a control packet of interaction between the receiving device of the to-be-assessed video and a video server, to obtain the FEC source block size and the FEC redundancy; or
parsing an FEC redundancy data packet of the first source block, to obtain the FEC source block size and the FEC redundancy.

13. The video quality assessment device according to claim 10, wherein the processor is further configured to execute the computer-executable instructions to enable the video quality assessment device to perform operations comprising:
when the quantity of lost data packets of the first source block is 0, or the quantity of lost data packets of the first source block is greater than the quantity of FEC redundancy data packets of the first source block, generating the first summary packet for the non-lost data packet of the first source block; and
calculating the first score of the to-be-assessed video based on the first summary packet.

14. The video quality assessment device according to claim 10, wherein the processor is further configured to execute the computer-executable instructions to enable the video quality assessment device to perform operations comprising:
receiving a retransmission request sent by a receiving device of the to-be-assessed video to a retransmission (RET) server, wherein the retransmission request is used to request the RET server to retransmit a data packet that is lost and cannot be recovered through FEC; and when a retransmission response returned by the RET server is received, generating a third summary packet for the data packet that is lost and cannot be recovered through FEC; and the calculating the first score of video of the to-be-assessed video based on the first summary packet and the second summary packet comprises:

calculating the first score of the to-be-assessed video based on the first summary packet, the second summary packet, and the third summary packet.

15. The video quality assessment device according to claim 10, wherein the second summary packet comprises: the RTP sequence number and the payload size of the lost data packet of the first source block, and summary information of a video transport stream (TS) packet of the lost data packet of the first source block.

* * * * *